US012807813B2

(12) United States Patent
(10) Patent No.: US 12,807,813 B2
(45) Date of Patent: Nov. 24, 2026

Dolatshahi-Pirouz et al.

(54) SUPRAMOLECULAR CONDUCTIVE POLYMER COMPOSITION

(71) Applicant: Danmarks Tekniske Universitet, Kongens Lyngby (DK)

(72) Inventors: Alireza Dolatshahi-Pirouz, Kongens Lyngby (DK); Firoz Babu Kadumudi, Kongens Lyngby (DK); Mehdi Mehrali, Kongens Lyngby (DK)

(73) Assignee: Danmarks Tekniske Universitet, Kongens Lyngby (DK)

( * ) Notice: Subject to any disclaimer, the term of this patent is extended or adjusted under 35 U.S.C. 154(b) by 1131 days.

(21) Appl. No.: 17/780,992

(22) PCT Filed: Dec. 2, 2020

(86) PCT No.: PCT/EP2020/084263
§ 371 (c)(1),
(2) Date: May 29, 2022

(87) PCT Pub. No.: WO2021/110743
PCT Pub. Date: Jun. 10, 2021

(65) Prior Publication Data

US 2022/0411635 A1 Dec. 29, 2022

(30) Foreign Application Priority Data

Dec. 2, 2019 (EP) .................................... 19212902

(51) Int. Cl.

| | |
|---|---|
| ***C08L 89/00*** | (2006.01) |
| ***G01L 1/22*** | (2006.01) |
| ***H01B 1/24*** | (2006.01) |

(52) U.S. Cl.
CPC ............ *C08L 89/00* (2013.01); *G01L 1/2281* (2013.01); *H01B 1/24* (2013.01); *C08L 2201/06* (2013.01); *C08L 2203/20* (2013.01)

(58) Field of Classification Search
CPC .. C08L 89/00; C08L 2201/06; C08L 2203/20; G01L 1/2281; G01L 1/20; H01B 1/24
See application file for complete search history.

(56) References Cited

U.S. PATENT DOCUMENTS

| | | | | |
|---|---|---|---|---|
| 2003/0236300 | A1* | 12/2003 | Caplan | A61K 31/47 514/456 |
| 2007/0255042 | A1* | 11/2007 | Valluzzi | B01J 20/26 530/353 |
| 2016/0237128 | A1* | 8/2016 | Omenetto | B23K 26/361 |

FOREIGN PATENT DOCUMENTS

| | | |
|---|---|---|
| CN | 106668931 | 5/2017 |
| CN | 107610816 | 1/2018 |

(Continued)

OTHER PUBLICATIONS

Machine translation of CN 110305339 (Year: 2019).*

(Continued)

*Primary Examiner* — Doris L Lee
(74) *Attorney, Agent, or Firm* — Suzannah K. Sundby, Esq.; Canady + Lortz LLP

(57) ABSTRACT

A supramolecular conductive polymer composition comprising; a polymer comprising repeating subunits comprising at least one functional group, for forming a part in a hydrogen bond, selected from alcohol, amine, ether, amide, carboxylic acid, ester, ketone, nitrile, aldehyde and carbamide; a polyphenol comprising a minimum of 12 aromatic hydroxyl groups; a solvent with a dielectric constant of at least 20; and an electrically conductive filler.

24 Claims, 13 Drawing Sheets

(56) References Cited

FOREIGN PATENT DOCUMENTS

| | | | |
|---|---|---|---|
| CN | 108359406 | 8/2018 | |
| CN | 108744023 | 11/2018 | |
| CN | 109422835 | 3/2019 | |
| CN | 110305339 | 10/2019 | |
| CN | 110305339 A * | 10/2019 | ......... C08B 37/0015 |

OTHER PUBLICATIONS

Kim, et al., TAPE: A Medical Adhesive Inspired by a Ubiquitous Compound in Plants, Mar. 16, 2015, pp. 2402-2410, vol. 25, Publisher: Adv Funct Mater.

Ma, et al., Effects of addition of condensed tannin on the structure and properties of silk fibroin film, Sep. 28, 2016, pp. 151-159, vol. 66, Publisher: Polym Int.

International Search Report received in PCT/EP2020/084263 mailed Mar. 18, 2021.

Written Opinion received in PCT/EP2020/084263 mailed Mar. 18, 2021.

* cited by examiner

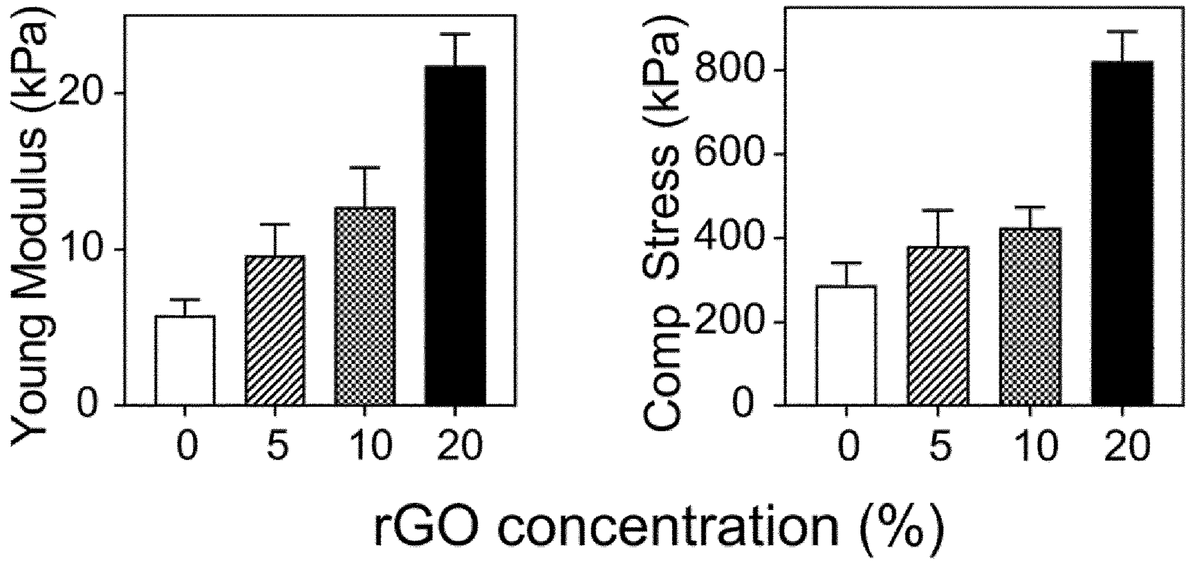
FIG 5A
FIG 5B
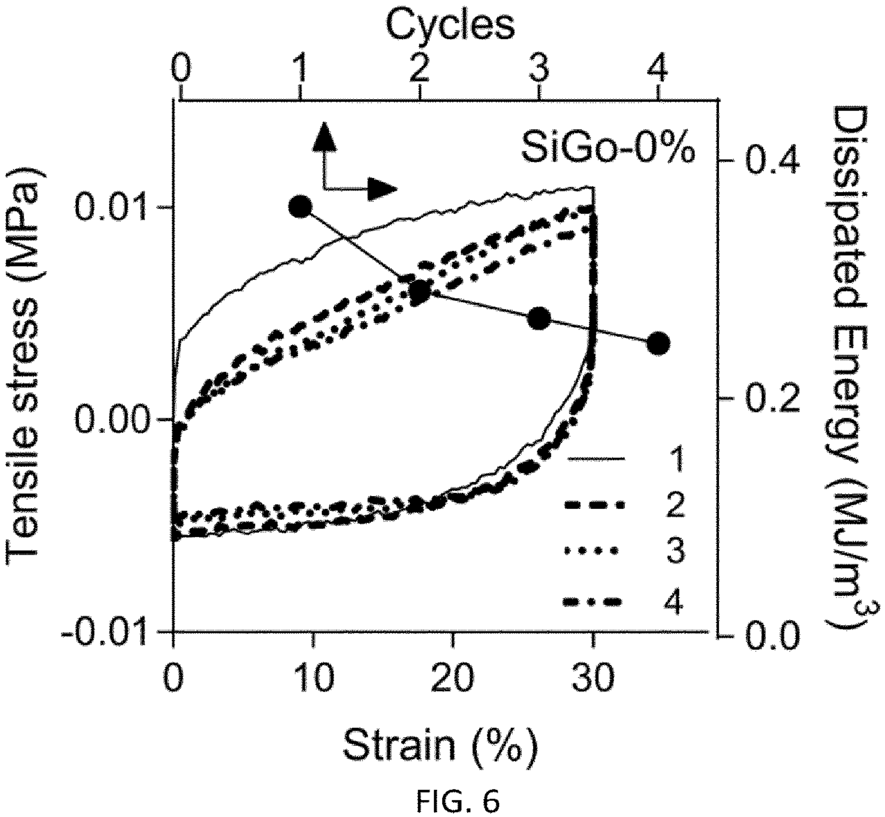
FIG. 6

SUPRAMOLECULAR CONDUCTIVE POLYMER COMPOSITION

The present disclosure relates to a supramolecular conductive polymer composition with improved properties, such as mechanical, electrical and self-healing, compared to present compositions. The present disclosure further relates to a stress sensor comprising the composition, a stress sensor assembly and a method for sensing stress.

BACKGROUND OF INVENTION

In recent years, human-like materials have received increasing interest due to their broad applications in robotics, wearable devices, epidermal electronics, implants and cybernetics. Human-like materials are those that can blend perfectly with organs and tissues for a longer period of time without any undesirable outcomes while at the same time retaining their predefined functions and inherent material properties. These materials also need to mimic the complex and curvilinear architecture of the human body, as well as recapitulating some of the mechanical and biological abilities of the target tissue or organ. In this respect, some of the unique aspects of many organs and tissues in the body—including musculoskeletal, skin, cardiac and tooth tissue—are their robustness, flexibility and ability to withstand dynamic forces from day-to-day activities and their ability to quickly remedy biological injuries inflicted upon them. However, for the present human-like materials, there is a strong conflict between the properties of the materials, in that one can only choose a few desired properties, among a list of multiple properties, including a sufficiently high strength, a sufficiently high toughness, self-healing properties while at the same time being non-toxic. For example, CN110305339A discloses a conductive hydrogel comprising a covalently cross-linked network of modified silk fibroin, and graphene nanoflakes that has been modified in a process involving a phenolic substance, wherein the phenolic substance does not form part of the final hydrogel. The disclosed hydrogel is relatively stiff with a Young's modulus above 100 kPa, and has a low elongation at break of 500%.

SUMMARY OF INVENTION

The present inventors have, inspired by the hierarchical organization of materials found in nature, employed a similar scheme based on hydrogen bonding between constituents of a composition in order to achieve human-like compositions with highly sought-after properties. A significant contributing factor to the properties of the compositions disclosed herein relies on the fact that hydrogen bonds are reversible. As a result, compositions which are based on hydrogen bonds may, under specific circumstances, display self-healing properties. The inventors have therefore realized compositions having surprisingly advantageous properties, with respect to compositions of prior. For example, specific embodiments of the present composition display a highly elastic behavior with an excellent Young's modulus, and an unprecedented elongation at break. In fact, certain embodiments of the present disclosure display an elongation at break as high as 20000%, or even higher. In part, the advantageous properties of the present disclosure may be attributed to a high degree of non-covalent interaction, in combination with a low degree, such as an absence, of covalent bonds between the constituents. For example, the composition may, in specific embodiments of the present disclosure, comprise a linear polymer.

The present disclosure therefore relates to a supramolecular conductive polymer composition comprising a polymer comprising repeating subunits comprising at least one functional group with a formula selected from the list including ROH, RNH2, R2NH, R3N; a polyphenol comprising a minimum of 12 aromatic hydroxyl groups; a solvent with a dielectric constant of at least 20; and an electrically conductive filler.

The composition has surprisingly shown to display self-healing properties, wherein for example cuts or cracks are able to heal, reforming substantially the original composition. The self-healing properties of the present disclosure may be attributed to reversible crosslinking within the polymeric matrix, which to a significant degree is mediated by the polyphenol. The polyphenol comprises a number of electron acceptor groups and/or electron donor groups such that a reversible network can be formed within the polymeric matrix. It has further been revealed that the reversible crosslinking within the polymeric matrix of the present disclosure has led to further highly sought-after mechanical properties, such as high elasticity.

Furthermore, the composition of the present disclosure has shown to be biocompatible, and therefore may be suitable for being implanted, and may hence function to promote internal wound-healing or sense motion of body parts, including internal organs. The composition may for example be used for sensing the beating of a heart.

In specific embodiments of the present disclosure the composition has shown to possess biodegradable properties. Thereby, an implanted composition may be degraded by time, for example during healing of a surgical wound, such that the composition is degraded following, or at the same time as, wound healing.

The polyphenol may play a significant role in providing the properties of the composition. While the polyphenol may be derived from natural sources, such as wine, oak, tea, grapes, olives and/or oil, such as olive oil, it may further be synthetic or semisynthetic. Extracting polyphenol, such as tannic acid, from natural sources may benefit the composition in that it may result in a more desired composition in terms of for example the biocompatibility and biodegradability of the composition.

Furthermore, the composition has been shown to possess antibacterial properties, which may make it suitable for applications where a decrease of bacterial activity is important, such as in the case of wound healing.

Further, the extraordinary properties of the composition has shown to render the composition highly suitable for use as an electrically active bone-glue for bone mineralization. The composition may be configured such that the electrical conductivity of the composition reduces while the organic bone matrix becomes filled with calcium phosphate nanocrystals which can be used for monitoring the bone mineralization.

Preferably the composition allows for molding, such as by displaying a significant decrease in the shear modulus and/or the Young's modulus at elevated temperatures, allowing for molding to take place. The composition may for example display such a significant change of its mechanical properties, that it is substantially a liquid at the elevated temperatures. In such a state the composition may be molded or printed into any desired shape and/or size.

The use of an electrically conductive filler ensures that the composition is electrically conductive. The composition may as a consequence, in combination with its other advantageous properties, such as high tissue adherence and high elasticity, be used as a stress sensor.

The present disclosure therefore further relates to a stress sensor, a stress sensor assembly and a method for use of the same, based on a composition as disclosed herein. By combining the composition with an electronic test equipment, such as for measuring the resistance of the composition, stretching the composition may result in a measurable resistance change which can be translated into for example a corresponding applied force, a stress and/or an elongation of the composition.

DESCRIPTION OF DRAWINGS

FIGS. 5A-B show graphs of the Young's modulus and the compression stress for SiGo compositions.

FIG. 6 shows cyclic tensile tests of SiGo-0%.

DETAILED DESCRIPTION OF THE INVENTION

Figures 1A, 1B, 1C:
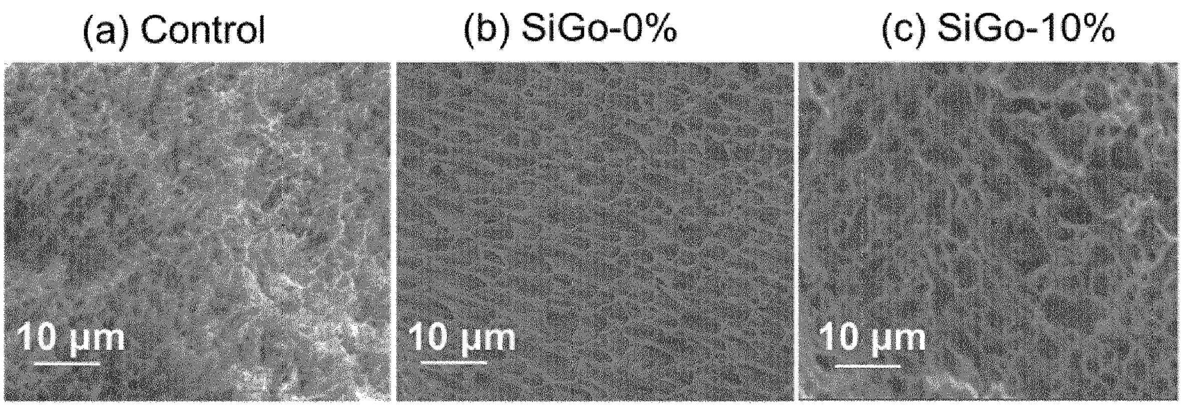
FIG. 1 shows scanning electron micrographs of the cross-section of (a) control, (b) SiGo-0% and (c) SiGo-10%.

The present disclosure relates to a supramolecular conductive polymer composition comprising a polymer comprising repeating subunits comprising at least one functional group selected from alcohol, amine, ether, amide, carboxylic acid, ester, ketone, nitrile, aldehyde and carbamide; a polyphenol comprising a minimum of 12 aromatic hydroxyl groups; a solvent with a dielectric constant of at least 20; and an electrically conductive filler.

The composition preferably comprises a significant degree of supramolecular chemistry and as such, comprises non-covalent interactions. These weak and reversible forces, such as hydrogen bonds, hydrophobic forces, van der Waals forces, and metal-ligand coordination have shown to be a key to understanding biological processes and self-assembling systems, and to constructing complex materials and molecular machinery.

As such, the polymer is preferably able to form hydrogen bonds due to comprising either hydrogen bond acceptor and/or hydrogen bond donors within repeating subunits. The subunits may for example be in the form of amines, such as primary ($RNH_2$), secondary ($R_2NH$) and/or tertiary amines ($R_3N$). Furthermore, the functional group may be in the form of an alcohol (ROH) for forming hydrogen bonds. The functional groups may further be selected from the list including alcohol, amine, ether, amide, carboxylic acid, ester, ketone, nitrile, aldehyde and/or carbamide, or any other functional group known by a person skilled in the art to be suitable for forming hydrogen bonds, such as by comprising a hydrogen bond acceptor and/or a hydrogen bond donor. The repeating units do not necessarily need to be similar, instead a single polymer may comprise multiple repeating units. Furthermore, different polymer chains may comprise different repeating units and/or have a different number of repeating units.

The composition preferably comprises a solvent for dissolving the constituents of the composition. The solvent being chosen such that the solvent has a dielectric constant ($\varepsilon$) of at least 20, more preferably 30, even more preferably at least 40, even more preferably at least 50, even more preferably at least 60, even more preferably at least 70, most preferably at least 78. As such the solvent shows a significant degree of polarity. The dielectric constant characterizes the solvent in terms of how well the solvent screens electrostatic forces. Solvents with high dielectric constants more effectively screen the attractive or repulsive forces between the ions and the end of dipoles. The partial charges on the polar solvent molecules interact with and diminish the effective charges on solutes and hence diminish the attractive or repulsive forces between charges on solutes.

Preferably the composition comprises an electrically conductive filler that is able to improve the electrical properties of the composition, depending on the final application of the composition. For example, if the composition is to be used as a stress sensor, the composition is required to be electrically conductive, preferably having a low resistivity. The electrically conductive filler, may itself comprise or consist of a conductor material, and may be dispersed throughout the composition. The electrically conductive filler may in certain embodiments of the present disclosure comprise entities that affect the electrical properties of other constituents of the composition, such as by reacting with the constituents.

The extraordinary properties of the composition has made it suitable for a wide range of applications. For example the composition, in a specific embodiment of the present disclosure, has been shown to be highly suitable for use as an electrically active bone-glue for bone mineralization. The composition may be configured such that the electrical conductivity of the composition reduces while the organic bone matrix becomes filled with calcium phosphate nanocrystals which can be used for monitoring the bone mineralization.

Polyphenol

Although polyphenols are mainly derived from natural sources, they may also be synthetically or semi-synthetically derived. In nature they are largely found in fruits, vegetables, cereals and beverages. Fruits like grapes, apple, pear, cherries and berries comprise up to 200-300 mg polyphenols per 100 grams fresh weight. The products manufactured from these fruits, also comprise polyphenols in significant amounts. Typically a glass of red wine or a cup of tea or coffee comprises about 100 mg polyphenols. Polyphenols are secondary metabolites of plants and are generally involved in defense against ultraviolet radiation or aggression by pathogens.

More than 8,000 polyphenolic compounds have been identified in various plant species. All plant phenolic compounds arise from a common intermediate, phenylalanine, or a close precursor, shikimic acid. Primarily they occur in conjugated forms, with one or more sugar residues linked to hydroxyl groups, although direct linkages of the sugar (polysaccharide or monosaccharide) to an aromatic carbon also exist. Association with other compounds, like carboxylic and organic acids, amines, lipids and linkage with other phenols is also common. Polyphenols may be classified into different groups as a function of the number of phenol rings that they comprise and on the basis of structural elements that bind these rings to one another. The main classes include phenolic acids, flavonoids, stilbenes and lignans.

The composition may comprise derivatives of phenolic compounds, for example, the rGO may comprise such derivatives. However, it is a strong preference that the composition, in addition to phenolic derivatives bound to rGO also comprises a significant amount of polyphenol, such as at least 10 wt. %, more preferably at least 20 wt. %, yet more preferably at least 30 wt. %. Preferably said additional polyphenol is not bound to rGO. Therefore, in an embodiment of the present disclosure, the composition comprises at least 10 wt. % of, more preferably at least 20 wt. %, yet more preferably at least 30 wt. % of a polyphenol that is not bound to rGO.

In one embodiment of the present disclosure the polyphenol has a molecular weight between 500 and 4000 Da, more preferably between 750 and 3000 Da, more preferably between 1000 and 2500 Da, most preferably between 1500 and 2000 Da. The molecular weight of the polyphenol has a significant impact on the interaction with the other constituents of the composition. The larger molecular weight of the polyphenol, the larger the polyphenol, meaning that it may be able to better crosslink different constituents of the composition, such as different polymer chains. Furthermore, it should be noted that a higher molecular weight, may lead to a smaller absolute number of polyphenols, given the same overall weight ratio between the polyphenol and the other constituents of the composition. An optimal number may therefore be present wherein the number of polyphenols in combination with their size give the most advantageous properties of the composition.

In one embodiment of the present disclosure the polyphenol is selected according to the White-Bate-Smith-Swain-Haslam (WBSSH) definition of a polyphenol. In these embodiments of the present disclosure the polyphenol is therefore a generally moderately water-soluble compound with a molecular weight of 500-4000 Da while it comprises more than 12 phenolic hydroxyl groups and approximately between 5-7 aromatic rings per 1000 Da.

In one embodiment of the present disclosure the polyphenol comprises or consists of between 2 and 40 gallic acid, pyrogallic acid, sinapoyl alcohol, coniferyl alcohol and/or paracoumaryl alcohol moieties.

In one embodiment of the present disclosure the number of moieties is between 2 and 40, more preferably between 5 and 40, yet more preferably between 10 and 40, yet even more preferably between 20 and 40, most preferably between 30 and 40.

In one embodiment of the present disclosure the polyphenol comprises or consists of between 2 and 40 moieties, more preferably between 2 and 30, yet more preferably between 2 and 20, yet even more preferably between 2 and 10, most preferably between 2 and 5.

In one embodiment of the present disclosure the polyphenol comprises or consists of between 2 and 40 moieties, more preferably between 5 and 30, yet more preferably between 10 and 25, yet even more preferably between 12 and 22, most preferably between 15 and 20.

The term moiety preferably describes the larger characteristic parts of the polyphenol molecule, which are made up of atoms that participate in similar chemical reactions, for example hydrogen bonding. The moieties may in itself be composed of yet smaller moieties and functional groups. The moieties may also be used to describe a functional group.

In one embodiment of the present disclosure the number of moieties and/or the type of moieties may differ between the polyphenols of the composition. In another embodiment of the present disclosure the number of moieties and/or the type of moieties of the polyphenols of the composition, are substantially the same.

In one embodiment of the present disclosure the polyphenol comprises between 3 and 28 aromatic rings. Aromatic rings (also typically referred to as aromatic compounds or arenes) are hydrocarbons which comprise benzene, or some other related ring structure.

In one embodiment of the present disclosure the number of aromatic rings is between 5 and 25, more preferably between 8 and 22, even more preferably between 10 and 18, yet even more preferably between 12 and 16, most preferably between 13 and 15.

In one embodiment of the present disclosure the number of aromatic rings is between 3 and 25, more preferably between 3 and 22, even more preferably between 3 and 18, yet even more preferably between 3 and 16, most preferably between 3 and 15.

In one embodiment of the present disclosure the number of aromatic rings is between 5 and 28, more preferably between 8 and 28, even more preferably between 10 and 28, yet even more preferably between 12 and 28, most preferably between 13 and 28.

A hydrogen bond may be a primarily electrostatic force of attraction between a hydrogen (H) atom which is covalently bound to a more electronegative atom or group, particularly the second-row elements nitrogen (N), oxygen (O), or fluorine (F), acting as a hydrogen bond donor (Dn), and another electronegative atom bearing a lone pair of electrons, acting as an hydrogen bond acceptor (Ac). There is a general agreement that there may be a minor covalent component to hydrogen bonding, especially for moderate to strong hydrogen bonds (>5 kcal/mol), although under some instances the importance of covalency in hydrogen bonding has been debated. At the opposite end of the scale, there is typically no clear boundary between a weak hydrogen bond and a van der Waals (e.g., dipole-dipole) interaction.

In order for the polyphenol to have a capability of forming multiple hydrogen bonds with the polymer, the polyphenol should comprise multiple hydrogen bond groups, such as hydrogen bond acceptor groups and/or hydrogen bond donor groups. These groups are suitable for forming hydrogen bonds to other hydrogen bond donor groups and/or hydrogen bond acceptor groups respectively. It should be noted that some groups, such as alcohol groups have the capability of acting as both an acceptor and a donor in a hydrogen bonding. Consequently this group may be considered to be both a hydrogen bond acceptor group and a hydrogen bond donor group, as known to a person skilled in the art.

In one embodiment of the present disclosure the polyphenol consists of or comprises between 1 and 40 hydrogen bond groups, more preferably between 3 and 35, even more preferably between 8 and 30, yet even more preferably between 12 and 25, again yet even more preferably between 15 and 20, most preferably between 16 and 18.

In one embodiment of the present disclosure the polyphenol consists of or comprises between 1 and 40 hydrogen bond groups, more preferably between 1 and 35, even more preferably between 1 and 30, yet even more preferably between 1 and 25, again yet even more preferably between 1 and 20, most preferably between 1 and 18.

In one embodiment of the present disclosure the polyphenol consists of or comprises between 1 and 40 hydrogen bond groups, more preferably between 3 and 40, even more preferably between 8 and 40, yet even more preferably between 12 and 40, again yet even more preferably between 15 and 40, most preferably between 16 and 40.

Hydrogen bonds may be intermolecular or intramolecular. Depending on the nature of the donor and acceptor atoms which constitute the bond, their geometry, and environment, the energy of a hydrogen bond can typically vary between 1 and 40 kcal/mol. As such, they are somewhat stronger than a van der Waals interaction, although this is debated, and weaker than fully covalent or ionic bonds.

In one embodiment of the present disclosure the polyphenol has between 1 and 40 hydrogen bond acceptor groups, preferably between 3 and 35 hydrogen bond acceptor groups, more preferably between 8 and 30 hydrogen bond acceptor groups, even more preferably between 12 and 25 hydrogen bond acceptor groups yet even more preferably between 13 and 21 bond acceptor groups, most preferably between 15 and 18 hydrogen bond acceptor groups.

In one embodiment of the present disclosure the polyphenol has between 1 and 40 hydrogen bond acceptor groups, preferably between 3 and 40 hydrogen bond acceptor groups, more preferably between 8 and 40 hydrogen bond acceptor groups, even more preferably between 12 and 40 hydrogen bond acceptor groups yet even more preferably between 13 and 40 hydrogen bond acceptor groups, most preferably between 15 and 40 hydrogen bond acceptor groups.

In one embodiment of the present disclosure the polyphenol has between 1 and 40 hydrogen bond acceptor groups, preferably between 1 and 35 hydrogen bond acceptor groups, more preferably between 1 and 30 hydrogen bond acceptor groups, even more preferably between 1 and 25 hydrogen bond acceptor groups yet even more preferably between 1 and 21 bond acceptor groups, most preferably between 1 and 18 hydrogen bond acceptor groups.

The acceptor group may consist of or comprise an electronegative atom bearing a lone pair of electrons, for forming a hydrogen bond, such as to a hydrogen atom covalently bond to a hydrogen bond donor, such as an electronegative atom or group, particularly the second-row elements nitrogen (N), oxygen (O), or fluorine (F).

In one embodiment of the present disclosure the polyphenol has between 1 and 40 hydrogen bond donor groups, preferably between 3 and 35 hydrogen bond donor groups, more preferably between 8 and 30 hydrogen bond donor groups, even more preferably between 12 and 25 hydrogen bond donor groups yet even more preferably between 13 and 21 hydrogen bond donor groups, most preferably between 15 and 18 hydrogen bond donor groups.

In one embodiment of the present disclosure the polyphenol has between 1 and 40 hydrogen bond donor groups, preferably between 3 and 40 hydrogen bond donor groups, more preferably between 8 and 40 hydrogen bond donor groups, even more preferably between 12 and 40 hydrogen bond donor groups yet even more preferably between 13 and 40 hydrogen bond donor groups, most preferably between 20 and 40 hydrogen bond donor groups.

In one embodiment of the present disclosure the polyphenol has between 1 and 40 hydrogen bond donor groups, preferably between 1 and 35 hydrogen bond donor groups, more preferably between 1 and 30 hydrogen bond donor groups, even more preferably between 1 and 20 hydrogen bond donor groups yet even more preferably between 1 and 15 bond donor groups, most preferably between 1 and 10 bond donor groups.

The hydrogen bond donor group may consist of or comprise an electronegative atom, particularly the second-row elements nitrogen (N), oxygen (O), or fluorine (F), for forming a covalent bond to a hydrogen atom such that a hydrogen bond may be form to a hydrogen bond acceptor group.

In one embodiment of the present disclosure the polyphenol is tannin. In another embodiment of the present disclosure the polyphenol is tannic acid. In one embodiment of the present disclosure the polyphenol comprises lignin and/or a lignin derivative.

Tannins are typically widely distributed in higher plants and occur at high levels in various feeds and foods. The presence of tannins has been associated with lower biological availability of various nutrients. Tannins may bind to organic polymers such as polyvinyl polypyrrolidone (PVPP) and polyethylene glycol (PEG). Typically, the binding between a polymer and a polyphenol takes place via hydrogen bonding which increases with, for example, the number of phenolic hydroxyl groups and may further be dependent on their position. Different tannins bind to organic polymers, such as PVPP or PEG to different extents. This may be a consequence of the different number of phenolic hydroxyl groups, to their different positions on the nucleus or to different conformations of these tannins. Binding of tannins to organic polymers may be higher for open and random-coiled tannins. Furthermore, the pH may affect the binding strength, wherein the binding strength may be stronger at moderately low pH, such as between pH 3-4, than at higher, such as pH 7. Therefore, tuning of the binding strength may be possible, such as by the change of pH, and/or other means, for example temperature.

In one embodiment of the present disclosure the polyphenol is extracted from natural sources, such as selected from the list including wine, oak, tea, grapes, olives and/or oil, such as olive oil.

Polymer

In one embodiment of the present disclosure the polymer has a molecular weight between 10 and 1500 kDa, such as between 100 and 1200 kDa, such as between 200 and 1000 kDa, such as between 400 and 800 kDa, such as about 500 and 700 kDa.

In a preferred embodiment of the present disclosure the polymer has a molecular weight below 2000 kDa, more preferably below 1500 kDa, even more preferably below 1000 kDa, most preferably below 750 kDa.

In an embodiment of the present disclosure, the polymer is a linear polymer. In such a case, the polymer is not a cross-linked polymer, wherein the chains of the polymer are joined together by a number of covalent bonds. A cross-linked polymer typically has a significantly higher molecular weight than a corresponding linear polymer, due to the molecular weight being around the sum of the molecular weight of each polymer chain that forms part in the cross-linked polymer network.

As used herein, a linear polymers refers to a polymer wherein the repeating units are joined together end to end in a single flexible chain. Typically linear polymers are made from monomers with single end group. Linear polymers containing side groups as part of monomer structure do not qualify as branched polymers. Some of the common examples of linear polymers are polyethylene, PVC, polystyrene, and polyamides.

Branched polymers have side chains or branches growing out from the main. The side chains or branches are typically made of the same repeating units as the main polymer chains. The branches result from side reactions during polymerization.

Cross-linked polymers are polymers in which the adjacent polymer chains, the chains or branches, are connected by covalent bonds in a network structure.

In an embodiment of the present disclosure, the composition comprises silk fibroin provided as a linear polymer. Thereby, the composition may comprise a linear chain polymer in the form of silk fibroin, wherein different linear silk fibroin polymer chains are connected only by hydrogen bonding and ionic interactions. In an embodiment of the present disclosure, the composition does not comprise a cross-linked polymer and/or a branched polymer.

In one embodiment of the present disclosure the polymer has a molecular weight between 10 and 1500 kDa, such as between 10 and 1200 kDa, such as between 10 and 1000 kDa, such as between 10 and 800 kDa, such as about 10 and 700 kDa.

In one embodiment of the present disclosure the polymer has a molecular weight between 10 and 1500 kDa, such as between 100 and 1500 kDa, such as between 200 and 1500 kDa, such as between 400 and 1500 kDa, such as about 500 and 1500 kDa.

Molecular weight of the polymer may be chosen such that the composition acquires the desired properties, wherein longer polymer chains may lead to a higher elasticity, but simultaneously a higher Young's modulus. Therefore, the polymer length may be chosen such that the mechanic properties are optimized for the application of the composition.

In one embodiment of the present disclosure the polymer has been subjected to an oxidation treatment, such as by treatment by acid and/or oxygen plasma, for formation of functional groups for forming part in a hydrogen bond. Additional methods, devices and treatments for the oxidations of polymers are known to a person skilled in the art. By the use of these methods/treatments, the polymer does not necessarily have to be provided as a polyphenol, but may instead be subjected to a treatment for formation of polyphenolic substances.

The terms molecular mass, molecular weight, and molar mass may be used interchangeably herein. These terms may be used for the mass of a given molecule measured in unified atomic mass units. The molecular mass may further be used herein to refer to a sample average of any number of polymers.

In one embodiment of the present disclosure the polymer comprises between about 1 and about 7 hydrogen-bond acceptor groups per repeated subunit, such as between 1 and 7, such as between 2 and 6, such as between 3 and 5, such as about 4.

In one embodiment of the present disclosure the polymer comprises between about 1 and about 7 hydrogen-bond acceptor groups per repeated subunit, such as between 1 and 7, such as between 1 and 6, such as between 1 and 5, such as between 1 and 3, such as about 1.

In one embodiment of the present disclosure the polymer comprises between about 1 and about 7 hydrogen-bond acceptor groups per repeated subunit, such as between 1 and 7, such as between 2 and 7, such as between 3 and 7, such as between 4 and 7, such as about 7.

In one embodiment of the present disclosure the polymer comprises between about 1 and about 7 hydrogen-bond donor groups per repeated subunit, such as between 1 and 7, such as between 2 and 6, such as between 3 and 5, such as about 4.

In one embodiment of the present disclosure the polymer comprises between about 1 and about 7 hydrogen-bond donor groups per repeated subunit, such as between 1 and 7, such as between 1 and 6, such as between 1 and 5, such as between 1 and 3, such as about 1.

In one embodiment of the present disclosure the polymer comprises between about 1 and about 7 hydrogen-bond donor groups per repeated subunit, such as between 1 and 7, such as between 2 and 7, such as between 3 and 7, such as between 4 and 7, such as about 7.

In one embodiment of the present disclosure the polymer is a polymer selected from the list including natural silk, synthetic silk, fibroin, such as fibroin heavy chain or fibroin light chain, starch, dextran, chitosan, polyvinyl alcohol, pectin, PEGDA, Polyacrylamide, polyethylene glycol, protein polymers or a mixture thereof. Additionally the polymer is suitable for forming hydrogen bonds, and thus comprises multiple hydrogen bond groups, such as groups comprising at least one hydrogen bond acceptor and/or at least one hydrogen bond donor. Other suitable polymers are known to a person skilled in the art.

In one embodiment of the present disclosure the polymer is a saturated polymer. The polymer may therefore be a saturated polymer, wherein only single bonds between carbon atoms occur, as such, the number of electrons have been saturated. The polymer may as a consequence be less reactive than an unsaturated counterpart.

In another embodiment of the present disclosure the polymer is an unsaturated polymer.

Fibroin is an insoluble protein present in silk, and may be produced by the larvae of Bombyx mori, other moth genera such as Antheraea, Cricula, Samia and Gonometa, and numerous other insects. Silk in its raw state may consist of two main proteins, sericin and fibroin, typically with a glue-like layer of sericin coating two singular filaments of fibroin called brins.

The silkworm typically produces fibroin with three chains, the light, heavy, and the glycoprotein P25. The heavy and light chains are linked by a disulphide bond, and P25 associates with disulphide-linked heavy and light chains by noncovalent interactions. P25 plays an important role in maintaining integrity of the complex. The heavy fibroin protein consists of layers of antiparallel beta sheets. Its primary structure mainly consists of the recurrent amino acid sequence $(Gly\text{-}Ser\text{-}Gly\text{-}Ala\text{-}Gly\text{-}Ala)_n$. The high glycine (and, to a lesser extent, alanine) content allows for tight packing of the sheets, which contributes to silk's rigid structure and tensile strength Fibroin is known to arrange itself in three structures, called silk I, II, and III. Silk I is the natural form of fibroin, as emitted from the Bombyx mori silk glands. Silk II refers to the arrangement of fibroin molecules in spun silk, which has greater strength and is often used in various commercial applications. Silk III is a recently discovered structure of fibroin. Silk III is formed principally in solutions of fibroin at an interface (i.e. air-water interface, water-oil interface, etc.).

In one embodiment of the present disclosure the polymer comprises fibroin in β-sheet and/or β-turn formation at between about 10 and 70% of its total length, such as between 10 and 70%, such as between 20 and 60%, such as between 30 and 50%, such as about 40%.

In one embodiment of the present disclosure the polymer comprises fibroin in β-sheet and/or β-turn formation at between about 10 and 70% of its total length, such as between 10 and 70%, such as between 10 and 60%, such as between 10 and 40%, such as between 10 and 30%, such as between 10 and 20%, such as about 10%.

In one embodiment of the present disclosure the polymer comprises fibroin in β-sheet and/or β-turn formation at between about 10 and 70% of its total length, such as between 10 and 70%, such as between 20 and 70%, such as between 30 and 70%, such as between 40 and 70%, such as between 50 and 70%, such as between 60 and 70%, such as about 70%.

In an embodiment of the present disclosure, the polymer is (silk) fibroin, wherein the polymer is in β-sheet and/or β-turn formation along a total fraction of its total length that is higher, preferably at least 10% higher, more preferably at least 20% higher, yet more preferably at least 30% higher, even more preferably at least 60% higher, most preferably at least 80% higher, than the fraction of the total length of an isolated and/or unmixed (silk) fibroin. In an embodiment of the present disclosure, the polymer comprises β-sheet and/or β-turn formations along a total fraction of its total length that is at least 20%, more preferably at least 25%, yet more preferably at least 30%, even yet more preferably at least 35%, once more even yet more preferably at least 40%, most preferably at least 50% of the total length of the polymer.

β-structure formation may be a result of the use of a divalent salt, wherein for example $Ca^{2+}$ ions may disrupt hydrophobic interactions and salt bridges between adjacent SF chains via charge shielding and instead facilitating a conformational transition of random coils to more ordered β-structures. Graphene may further increase the percentage of β-structures due through surface facilitated polypeptide chain folding, wherein the interface of a 2D material can induce conformational changes from random coils and α-helices to crystalline β-structures.

Preferably the solvent is able to dissolve at least part of the constituents of the compositions, such as the polymer and/or the polyphenol. Preferably the polarity of the solvent is sufficiently high such that it can dissolve at least part of the constituents of the composition. The solvent may therefore be a polar solvent, such as being defined by the dielectric constant (also commonly referred to as the relative permittivity) of the solvent. Preferably the solvent is selected from any liquid with a dielectric constant (ϵ) of at least 20, more preferably at least 30, more preferably at least 40, more preferably at least 50, more preferably at least 60, more preferably at least 70, most preferably around 78. The solvent may be chosen by the dielectric constant of that specific solvent at room temperature, such as at around 25° C., such as at exactly 25° C. In another embodiment of the present disclosure the solvent is chosen by the dielectric constant of that specific solvent at an elevated temperature such as at 30° C., such as at 35° C., such as at 40° C., such as at 50° C., such as at 55° C., such as at 60° C., such as at 65° C., such as at 70° C., such as at 75° C.

In one embodiment of the present disclosure the solvent is water, such as pure water, distilled water, deionized water, tap water, filtered water.

In an embodiment of the present disclosure, the electrically conductive filler is selected from the list including graphene, intrinsically conducting polymers such as Polyaniline, Polypyrrole, Poly(3,4-ethylenedioxythiophene) and/or polystyrene sulfonate, iron ions, 2D transition metal carbides, carbonitrides, nitrides, MXenes, nanoclays such as bentonite, kaolinite, hectorite, halloysite, and/or montmorillonite, and/or elongated carbon nanostructures, such as carbon nanotubes.

In a further embodiment of the present disclosure the electrically conductive filler is selected from the list including graphene, iron ions, MXenes, nanoclays (bentonite, kaolinite, hectorite, halloysite, and montmorillonite) and/or carbon nanotubes. Preferably the electrically conductive filler is chosen such that the composition has advantageous electrical properties. The electrically conductive filler may for example give rise to a composition that can act as a stress sensor, wherein the stress exerted on the composition results in a measurable electrical resistance change due to for example the deformation of the composition. As such, the electrical resistance of the composition may be sensitive to the strain exerted on the composition.

The electrically conductive filler is preferably chosen such that the resistivity of the composition is low. The electrically conductive filler may be chosen such that it provides these advantageous electrical properties without resulting in a significant change to the mechanical properties of the composition, as compared to the same composition not having the electrically conductive filler.

In one embodiment of the present disclosure the conductivity of the composition is between $1\times10^{-6}$ and $1\times10^{-1}$ S/cm, such as between $1\times10^{-5}$ and $1\times10^{-2}$ S/cm, such as between $1\times10^{-4}$ and $1\times10^{-3}$ S/cm, such as approximately $5\times10^{-4}$.

In one embodiment of the present disclosure the conductivity of the composition is between $1\times10^{-6}$ and $1\times10^{-1}$ S/cm, such as between $1\times10^{-6}$ and $1\times10^{-2}$ S/cm, such as between $1\times10^{-6}$ and $1\times10^{-3}$ S/cm, such as between $1\times10^{-6}$ and $1\times10^{-4}$ S/cm, such as between $1\times10^{-6}$ and $1\times10^{-5}$ S/cm, such as approximately $5\times10^{-6}$. In one embodiment of the present disclosure the conductivity of the composition is between $1\times10^{-6}$ and $1\times10^{-1}$ S/cm, such as between $1\times10^{-5}$ and $1\times10^{-1}$ S/cm, such as between $1\times10^{-4}$ and $1\times10^{-1}$ S/cm, such as between $1\times10^{-3}$ and $1\times10^{-1}$ S/cm, such as between $1\times10^{-2}$ and $1\times10^{-1}$ S/cm, such as approximately $5\times10^{-2}$.

Composition Constituents

Preferably the supramolecular conductive polymer composition comprises a polymer, a polyphenol, a solvent and an electrically conductive filler. The specific, advantageous and unique properties of the present disclosure are attributed to the constituents of said composition, such as the relative properties of the constituents, and/or the absolute weight percentage of specific constituents of the composition.

Therefore, in one embodiment the present disclosure the composition comprises between 10 and 60 wt. % of the polymer (the composition comprises the polymer at between 10-60 wt. %), such as between 15 and 55 wt. % of the polymer, such as between 20 and 50 wt. % of the polymer, such as between 25 and 45 wt. % of the polymer, such as between 30 and 40 wt. % of the polymer, such as approximately 35 wt. % of the polymer.

In one embodiment of the present disclosure the composition comprises between 10 and 60 wt. % of the polymer, such as between 10 and 55 wt. % of the polymer, such as between 10 and 50 wt. % of the polymer, such as between 10 and 45 wt. % of the polymer, such as between 10 and 40 wt. % of the polymer, such as between 10 and 35 wt. % of the polymer, such as between 10 and 30 wt. % of the polymer, such as between 10 and 25 wt. % of the polymer, such as between 10 and 20 wt. % of the polymer, such as between 10 and 15 wt. % of the polymer, such as approximately 13 wt. % of the polymer.

In one embodiment of the present disclosure the composition comprises between 10 and 60 wt. % of the polymer, such as between 15 and 60 wt. % of the polymer, such as between 20 and 60 wt. % of the polymer, such as between 25 and 60 wt. % of the polymer, such as between 30 and 60 wt. % of the polymer, such as between 35 and 60 wt. % of the polymer, such as between 40 and 60 wt. % of the polymer, such as between 45 and 60 wt. % of the polymer, such as between 50 and 60 wt. % of the polymer, such as approximately 55 wt. % of the polymer.

In one embodiment of the present disclosure the composition comprises between 10 and 70 wt. % of the polyphenol, such as between 15 and 65 wt. % of the polyphenol, such as between 20 and 60 wt. % of the polyphenol, such as between 25 and 55 wt. % of the polyphenol, such as between 30 and 50 wt. % of the polyphenol, such as between 35 and 45 wt. % of the polyphenol, such as approximately 40 wt. % of the polyphenol.

In one embodiment of the present disclosure the composition comprises between 10 and 70 wt. % of the polyphenol, such as between 10 and 65 wt. % of the polyphenol, such as between 10 and 60 wt. % of the polyphenol, such as between 10 and 55 wt. % of the polyphenol, such as between 10 and 50 wt. % of the polyphenol, such as between 10 and 45 wt. % of the polyphenol, such as between 10 and 40 wt. % of the polyphenol, such as between 10 and 35 wt. % of the polyphenol, such as between 10 and 30 wt. % of the polyphenol, such as between 10 and 25 wt. % of the polyphenol, such as between 10 and 20 wt. % of the polyphenol, such as between 10 and 15 wt. % of the polyphenol, such as approximately 13 wt. % of the polyphenol.

In one embodiment of the present disclosure the composition comprises between 10 and 70 wt. % of the polyphenol, such as between 15 and 70 wt. % of the polyphenol, such as between 20 and 70 wt. % of the polyphenol, such as between 25 and 70 wt. % of the polyphenol, such as between 30 and 70 wt. % of the polyphenol, such as between 35 and 70 wt. % of the polyphenol, such as between 40 and 70 wt. % of the polyphenol, such as between 45 and 70 wt. % of the polyphenol, such as between 50 and 70 wt. % of the polyphenol, such as between 55 and 70 wt. % of the polyphenol, such as between 60 and 70 wt. % of the polyphenol, such as between 65 and 70 wt. % of the polyphenol, such as approximately 67 wt. % of the polyphenol.

In one embodiment of the present disclosure the composition comprises between 10 and 90 wt. % of the solvent, such as between 15 and 85 wt. % of the solvent, such as between 20 and 80 wt. % of the solvent, such as between 25 and 75 wt. % of the solvent, such as between 30 and 70 wt. % of the solvent, such as between 35 and 65 wt. % of the solvent, such as between 40 and 60 wt. % of the solvent, such as between 45 and 55 wt. % of the solvent, such as approximately 50 wt. % of the solvent.

In one embodiment of the present disclosure the composition comprises between 10 and 90 wt. % of the solvent, such as between 15 and 90 wt. % of the solvent, such as between 20 and 90 wt. % of the solvent, such as between 25 and 90 wt. % of the solvent, such as between 30 and 90 wt. % of the solvent, such as between 35 and 90 wt. % of the solvent, such as between 40 and 90 wt. % of the solvent, such as between 45 and 90 wt. % of the solvent, such as between 50 and 90 wt. % of the solvent, such as between 55 and 90 wt. % of the solvent, such as between 60 and 90 wt. % of the solvent, such as between 65 and 90 wt. % of the solvent, such as between 70 and 90 wt. % of the solvent, such as between 75 and 90 wt. % of the solvent, such as between 80 and 90 wt. % of the solvent, such as between 85 and 90 wt. % of the solvent, such as approximately 87 wt. % of the solvent.

In one embodiment of the present disclosure the composition comprises between 10 and 90 wt. % of the solvent, such as between 10 and 85 wt. % of the solvent, such as between 10 and 80 wt. % of the solvent, such as between 10 and 75 wt. % of the solvent, such as between 10 and 70 wt. % of the solvent, such as between 10 and 65 wt. % of the solvent, such as between 10 and 60 wt. % of the solvent, such as between 10 and 55 wt. % of the solvent, such as between 10 and 50 wt. % of the solvent, such as between 10 and 45 wt. % of the solvent, such as between 10 and 40 wt. % of the solvent, such as between 10 and 35 wt. % of the solvent, such as between 10 and 30 wt. % of the solvent, such as between 10 and 25 wt. % of the solvent, such as between 10 and 20 wt. % of the solvent, such as between 10 and 15 wt. % of the solvent, such as approximately 13 wt. % of the solvent.

In one embodiment of the present disclosure the composition comprises approximately between 0 and 40 wt. % of the conductive filler, such as between 5 and 35 wt. % of the conductive filler, such as between 10 and 30 wt. % of the conductive filler, such as between 15 and 25 wt. % of the conductive filler, such as approximately 20 wt. % of the conductive filler.

In one embodiment of the present disclosure the composition comprises approximately between 0 and 40 wt. % of the conductive filler, such as between 0 and 35 wt. % of the conductive filler, such as between 0 and 30 wt. % of the conductive filler, such as between 0 and 25 wt. % of the conductive filler, such as between 0 and 20 wt. % of the conductive filler, such as between 0 and 15 wt. % of the conductive filler, such as between 0 and 10 wt. % of the conductive filler, such as between 0 and 5 wt. % of the conductive filler.

In one embodiment of the present disclosure the composition comprises approximately between 0 and 40 wt. % of the conductive filler, such as between 5 and 40 wt. % of the conductive filler, such as between 10 and 40 wt. % of the conductive filler, such as between 15 and 40 wt. % of the conductive filler, such as between 20 and 40 wt. % of the conductive filler, such as between 25 and 40 wt. % of the conductive filler, such as between 30 and 40 wt. % of the conductive filler, such as between 35 and 40 wt. % of the conductive filler.

In one embodiment of the present disclosure the weight ratios between the polymer, the polyphenol, the solvent and the conductive filler are within the intervals 10-60:10-90:10-90:0.1-30 respectively, such as within the intervals 20-50:20-80:20-80:5-20 respectively, such as within the intervals 30-40:30-70:30-70:10-20 respectively. An overview of preferable relative weight ratio ranges of the constituents of the composition without salt are given in Table 1. It is a preference that the numbers are selected such that the total sum equals 100. An overview of preferable relative weight ratio ranges of the constituents of the formulation without salt are given in Table 1A. However, in a preferred embodiment of the present disclosure, the constituents of the formulation without salt are given in Table 1B, please note that the values in this table do not include the solvent content.

TABLE 1A composition constituents, given as the relative weight ratio between the constituents on the composition, for a composition without salt.

| Constituent | Interval 1 | Interval 2 | Interval 3 | Interval 4 | Interval 5 | Interval 6 |
|---|---|---|---|---|---|---|
| Polymer | 10-60 | 20-50 | 25-40 | 25-40 | 25-40 | 30-40 |
| Polyphenol | 10-90 | 20-80 | 30-70 | 40-70 | 40-70 | 45-65 |
| Solvent | 10-90 | 20-80 | 30-70 | 40-70 | 40-70 | 45-65 |
| Conductive filler | 0.1-30 | 5-30 | 5-30 | 10-30 | 15-30 | 20-30 |

TABLE 1B composition constituents, given as the relative weight ratio between the constituents on the composition, for a composition without salt.

| Constituent | Interval 1 | Interval 2 | Interval 3 | Interval 4 | Interval 5 | Interval 6 |
|---|---|---|---|---|---|---|
| Polymer | 10-60 | 20-50 | 25-40 | 25-40 | 25-40 | 30-40 |
| Polyphenol | 10-90 | 20-80 | 30-70 | 40-70 | 40-70 | 45-65 |
| Conductive filler | 0.1-30 | 5-30 | 5-30 | 10-30 | 15-30 | 20-30 |

Composition with Salt

In one embodiment of the present disclosure the composition comprises a salt, such as calcium chloride, magnesium chloride and/or lithium chloride. In a preferred embodiment of the present disclosure, the salt comprises or consists of a divalent salt, such as $CaCl_2$ or $MgCl_2$. Preferably the salt is selected such that it affects the interaction between the constituents of the composition, such as the bonding between the constituents, such as the bonding between the polymer and the polyphenol. The salt may be used to tune the interaction, such as the bond strength, and the resulting mechanical properties, in order to achieve a composition with advantageous properties. In one embodiment of the present disclosure the salt is chosen (i.e. the type of salt and/or the amount of the salt) such that it decreases the resistivity of the composition to a significant degree, for stress sensing. In another embodiment of the present disclosure the salt is chosen such that the main contribution is its modification of the mechanical properties of the composition. In one embodiment of the present disclosure the salt acts to screen charges of various constituents of the sample. In a specific embodiment of the present disclosure, the composition comprises salt, in an amount of salt and/or a type of salt, selected such that it facilitates a conformational transition of random coils of the polymer (e.g. silk fibroin) to more ordered β-structures. β-structures herein includes β-sheets and β-turn structures.

In one embodiment of the present disclosure the composition comprises approximately between 0 and 20 wt. % of the salt, such as between 2 and 16 wt. % of the salt, such as between 5 and 12 wt. % of the salt, such as between 8 and 10 wt. % of the salt.

In one embodiment of the present disclosure the composition comprises approximately between 0 and 20 wt. % of the salt, such as between 0 and 16 wt. % of the salt, such as between 0 and 12 wt. % of the salt, such as between 0 and 10 wt. % of the salt, such as between 0 and 7 wt. % of the salt, such as between 0 and 4 wt. % of the salt, such as approximately 2 wt. % of the salt.

In one embodiment of the present disclosure the composition comprises approximately between 0 and 20 wt. % of the salt, such as between 3 and 20 wt. % of the salt, such as between 7 and 20 wt. % of the salt, such as between 11 and 20 wt. % of the salt, such as between 14 and 20 wt. % of the salt, such as between 17 and 20 wt. % of the salt, such as approximately 18 wt. % of the salt.

TABLE 2A

Composition constituents, given as the relative weight ratio between the constituents of the composition, composition comprising salt.

| Constituent | Interval 1 | Interval 2 | Interval 3 | Interval 4 | Interval 5 | Interval 6 |
|---|---|---|---|---|---|---|
| Polymer | 10-60 | 15-60 | 15-55 | 20-55 | 25-55 | 30-50 |
| Polyphenol | 10-90 | 20-80 | 25-75 | 30-75 | 35-75 | 30-50 |
| Solvent | 10-90 | 20-80 | 25-75 | 30-75 | 35-75 | 30-60 |
| Conductive filler | 0.1-30 | 0.1-25 | 5-25 | 10-25 | 10-25 | 10-20 |
| Salt | 0-20 | 0.1-20 | 5-20 | 10-20 | 10-20 | 10-15 |

In one embodiment of the present disclosure the weight ratios between the polymer, the polyphenol, the solvent, the conductive filler and the salt are within the intervals 10-60:10-70:20-90:0-30:0-20 respectively, such as within the intervals 20-50:20-60:30-80:5-20:5-15 respectively, such as within the intervals 30-40:30-50:40-70:10-20:9-14 respectively. An overview of preferable relative weight ratio ranges of the constituents of the composition comprising salt are given in Table 2A.

In a preferred embodiment of the present disclosure, the weight ratios between the polymer, the polyphenol, the conductive filler and the salt are within the intervals 10-40:25-75:3-15:10-20 respectively. In a further embodiment of the present disclosure, the weight percentages of the polymer, the polyphenol, the conductive filler and the salt are within the intervals 10-40:25-75:3-15:10-20 respectively, wherein the amount of the different constituents are selected such that they add up to 100 wt. %. An overview of preferable relative weight ratio ranges of the constituents of the composition comprising salt are given in Table 2B.

TABLE 2B

Composition constituents, given as the relative weight ratio between the constituents of the composition comprising salt.

| Constituent | Interval 1 | Interval 2 | Interval 3 | Interval 4 | Interval 5 | Interval 6 |
|---|---|---|---|---|---|---|
| Polymer | 10-60 | 10-50 | 10-40 | 20-40 | 25-40 | 30-40 |
| Polyphenol | 10-90 | 20-80 | 25-75 | 30-75 | 35-75 | 30-50 |
| Conductive filler | 0.1-30 | 0.1-25 | 3-15 | 10-25 | 10-25 | 10-20 |
| Salt | 0-20 | 0.1-20 | 10-20 | 10-20 | 10-20 | 10-15 |

Formulation Constituents

Preferably the supramolecular conductive polymer composition comprises a polymer, a polyphenol, a solvent and an electrically conductive filler. The specific, advantageous and unique properties of the present disclosure is attributed to the constituents of said composition, such as the relative properties of the constituents, and/or the absolute weight percentage of specific constituents of the composition. Said composition is preferably formed from a formulation, wherein the formulation comprises, or consists of, formulation constituents. The formulation constituents may be used in any process known to a person skilled in the art for the formation of the supramolecular conductive polymer composition of the present disclosure. For example, the formulation may be mixed at a specific temperature, such as room temperature and/or at elevated temperatures. Additionally or alternatively, the formulation may comprise formation components, such as catalysts or reactants for formation of said composition, as known to a person skilled in the art. In one embodiment of the present disclosure the catalysts are removed following formation of said composition and do not form part of said composition.

In one embodiment of the present disclosure the formulation comprises between 10 and 60 wt. % of the polymer, such as between 15 and 55 wt. % of the polymer, such as between 20 and 50 wt. % of the polymer, such as between 25 and 45 wt. % of the polymer, such as between 30 and 40 wt. % of the polymer, such as approximately 35 wt. % of the polymer.

In one embodiment of the present disclosure the formulation comprises between 10 and 60 wt. % of the polymer, such as between 10 and 55 wt. % of the polymer, such as between 10 and 50 wt. % of the polymer, such as between 10 and 45 wt. % of the polymer, such as between 10 and 40 wt. % of the polymer, such as between 10 and 35 wt. % of the polymer, such as between 10 and 30 wt. % of the polymer, such as between 10 and 25 wt. % of the polymer, such as between 10 and 20 wt. % of the polymer, such as between 10 and 15 wt. % of the polymer, such as approximately 13 wt. % of the polymer.

In one embodiment of the present disclosure the formulation comprises between 10 and 60 wt. % of the polymer, such as between 15 and 60 wt. % of the polymer, such as between 20 and 60 wt. % of the polymer, such as between 25 and 60 wt. % of the polymer, such as between 30 and 60 wt. % of the polymer, such as between 35 and 60 wt. % of the polymer, such as between 40 and 60 wt. % of the polymer, such as between 45 and 60 wt. % of the polymer, such as between 50 and 60 wt. % of the polymer, such as approximately 55 wt. % of the polymer.

In one embodiment of the present disclosure the formulation comprises between 10 and 70 wt. % of the polyphenol, such as between 15 and 65 wt. % of the polyphenol, such as between 20 and 60 wt. % of the polyphenol, such as between 25 and 55 wt. % of the polyphenol, such as between 30 and 50 wt. % of the polyphenol, such as between 35 and 45 wt. % of the polyphenol, such as approximately 40 wt. % of the polyphenol.

In one embodiment of the present disclosure the formulation comprises between 10 and 70 wt. % of the polyphenol, such as between 10 and 65 wt. % of the polyphenol, such as between 10 and 60 wt. % of the polyphenol, such as between 10 and 55 wt. % of the polyphenol, such as between 10 and 50 wt. % of the polyphenol, such as between 10 and 45 wt. % of the polyphenol, such as between 10 and 40 wt. % of the polyphenol, such as between 10 and 35 wt. % of the polyphenol, such as between 10 and 30 wt. % of the polyphenol, such as between 10 and 25 wt. % of the polyphenol, such as between 10 and 20 wt. % of the polyphenol, such as between 10 and 15 wt. % of the polyphenol, such as approximately 13 wt. % of the polyphenol.

In one embodiment of the present disclosure the formulation comprises between 10 and 70 wt. % of the polyphenol, such as between 15 and 70 wt. % of the polyphenol, such as between 20 and 70 wt. % of the polyphenol, such as between 25 and 70 wt. % of the polyphenol, such as between 30 and 70 wt. % of the polyphenol, such as between 35 and 70 wt. % of the polyphenol, such as between 40 and 70 wt. % of the polyphenol, such as between 45 and 70 wt. % of the polyphenol, such as between 50 and 70 wt. % of the polyphenol, such as between 55 and 70 wt. % of the polyphenol, such as between 60 and 70 wt. % of the polyphenol, such as between 65 and 70 wt. % of the polyphenol, such as approximately 67 wt. % of the polyphenol.

In one embodiment of the present disclosure the formulation comprises between 10 and 90 wt. % of the solvent, such as between 15 and 85 wt. % of the solvent, such as between 20 and 80 wt. % of the solvent, such as between 25 and 75 wt. % of the solvent, such as between 30 and 70 wt. % of the solvent, such as between 35 and 65 wt. % of the solvent, such as between 40 and 60 wt. % of the solvent, such as between 45 and 55 wt. % of the solvent, such as approximately 50 wt. % of the solvent.

In one embodiment of the present disclosure the formulation comprises between 10 and 90 wt. % of the solvent, such as between 15 and 90 wt. % of the solvent, such as between 20 and 90 wt. % of the solvent, such as between 25 and 90 wt. % of the solvent, such as between 30 and 90 wt. % of the solvent, such as between 35 and 90 wt. % of the solvent, such as between 40 and 90 wt. % of the solvent, such as between 45 and 90 wt. % of the solvent, such as between 50 and 90 wt. % of the solvent, such as between 55 and 90 wt. % of the solvent, such as between 60 and 90 wt. % of the solvent, such as between 65 and 90 wt. % of the solvent, such as between 70 and 90 wt. % of the solvent, such as between 75 and 90 wt. % of the solvent, such as between 80 and 90 wt. % of the solvent, such as between 85 and 90 wt. % of the solvent, such as approximately 87 wt. % of the solvent.

In one embodiment of the present disclosure the formulation comprises between 10 and 90 wt. % of the solvent, such as between 10 and 85 wt. % of the solvent, such as between 10 and 80 wt. % of the solvent, such as between 10 and 75 wt. % of the solvent, such as between 10 and 70 wt. % of the solvent, such as between 10 and 65 wt. % of the solvent, such as between 10 and 60 wt. % of the solvent, such as between 10 and 55 wt. % of the solvent, such as between 10 and 50 wt. % of the solvent, such as between 10 and 45 wt. % of the solvent, such as between 10 and 40 wt. % of the solvent, such as between 10 and 35 wt. % of the solvent, such as between 10 and 30 wt. % of the solvent, such as between 10 and 25 wt. % of the solvent, such as between 10 and 20 wt. % of the solvent, such as between 10 and 15 wt. % of the solvent, such as approximately 13 wt. % of the solvent.

In one embodiment of the present disclosure the formulation comprises approximately between 0 and 40 wt. % of the conductive filler, such as between 5 and 35 wt. % of the conductive filler, such as between 10 and 30 wt. % of the conductive filler, such as between 15 and 25 wt. % of the conductive filler, such as approximately 20 wt. % of the conductive filler.

In one embodiment of the present disclosure the formulation comprises approximately between 0 and 40 wt. % of the conductive filler, such as between 0 and 35 wt. % of the conductive filler, such as between 0 and 30 wt. % of the conductive filler, such as between 0 and 25 wt. % of the conductive filler, such as between 0 and 20 wt. % of the conductive filler, such as between 0 and 15 wt. % of the conductive filler, such as between 0 and 10 wt. % of the conductive filler, such as between 0 and 5 wt. % of the conductive filler.

In one embodiment of the present disclosure the formulation comprises approximately between 0 and 40 wt. % of the conductive filler, such as between 5 and 40 wt. % of the conductive filler, such as between 10 and 40 wt. % of the conductive filler, such as between 15 and 40 wt. % of the conductive filler, such as between 20 and 40 wt. % of the conductive filler, such as between 25 and 40 wt. % of the conductive filler, such as between 30 and 40 wt. % of the conductive filler, such as between 35 and 40 wt. % of the conductive filler.

In one embodiment of the present disclosure the weight ratios between the polymer, the polyphenol, the solvent and the conductive filler are within the intervals 10-60:10-90:10-90:0.1-30 respectively, such as within the intervals 20-50:20-80:20-80:5-20 respectively, such as within the intervals 30-40:45-65:45-65:20-30 respectively. An overview of preferable relative weight ratio ranges of the constituents of the formulation without salt are given in Table 1A. However, in a preferred embodiment of the present disclosure, the constituents of the formulation without salt are given in Table 1B, please note that the values in this table do not include the solvent content.

Formulation with Salt

In one embodiment of the present disclosure the formulation comprises a salt, such as calcium chloride, magnesium chloride and/or lithium chloride. Preferably the salt affects the interaction between the constituents of the composition, such as the bonding between the constituents, such as the bonding between the polymer and the polyphenol. The relative amount of salt may be used for tuning the interactions between constituents of the final composition, such as the bond strength, and the resulting mechanical properties, in order to form a composition having the desired unique and advantageous properties. In one embodiment of the present disclosure the salt is chosen such that it decreases the resistivity of the composition to a significant degree, for stress sensing. In another embodiment of the present disclosure the salt is chosen such that the main contribution is its modification of the mechanical properties of the composition. In one embodiment of the present disclosure the salt acts to screen charges of various constituents of the sample.

In one embodiment of the present disclosure the composition comprises approximately between 0 and 20 wt. % of the salt, such as between 2 and 16 wt. % of the salt, such as between 5 and 12 wt. % of the salt, such as between 8 and 10 wt. % of the salt.

In one embodiment of the present disclosure the composition comprises approximately between 0 and 20 wt. % of the salt, such as between 0 and 16 wt. % of the salt, such as between 0 and 12 wt. % of the salt, such as between 0 and 10 wt. % of the salt, such as between 0 and 7 wt. % of the salt, such as between 0 and 4 wt. % of the salt, such as approximately 2 wt. % of the salt.

In one embodiment of the present disclosure the composition comprises approximately between 0 and 20 wt. % of the salt, such as between 3 and 20 wt. % of the salt, such as between 7 and 20 wt. % of the salt, such as between 11 and 20 wt. % of the salt, such as between 14 and 20 wt. % of the salt, such as between 17 and 20 wt. % of the salt, such as approximately 18 wt. % of the salt.

In one embodiment of the present disclosure the weight ratios between the polymer, the polyphenol, the solvent, the conductive filler and the salt are within the intervals 10-60:10-70:20-90:0-30:0-20 respectively, such as within the intervals 20-50:20-60:30-80:5-20:5-15 respectively, such as within the intervals 30-40:30-50:40-70:10-20:9-14 respectively. An overview of relative weight ratio ranges according to a specific embodiment of the present disclosure, of the constituents of the formulation comprising salt are given in Table 2A. However, in a preferred embodiment of the present disclosure, the constituents of the formulation comprising salt are given in Table 2B, please note that the values in this table do not include the solvent content.

Self-Healing

A general polymer may be divided into two parts by yielding to mechanical stress through cleavage of sigma bonds. The factors that determine how a polymer will yield include the type of stress, the chemical properties inherent to the polymer, the level and type of solvation, and the temperature. From a macromolecular perspective, stress induced damage at the molecular level leads to larger scale damage called microcracks. A microcrack is formed where neighboring polymer chains have been damaged in close proximity, ultimately leading to weakening of the fiber as a whole which may render the polymer unusable.

Surprisingly, the composition of the present disclosure has shown to possess self-healing properties, wherein the damages to the composition, such as cracks or cleavages, may be repaired, such as by autonomic healing of the composition. This property is something the composition of the present disclosure shares with for example supramolecular polymers, which is a group of polymers that are composed of monomers that interact non-covalently. Common interactions between the parts forming such a composition include hydrogen bonds, metal coordination, and van der Waals forces. Mechanical stress in supramolecular polymers causes the disruption of these specific non-covalent interactions, leading to monomer separation and polymer breakdown. Polymers may include autonomic healing supramolecular networks as well as temperature triggered supramolecular networks, such as wherein healing is promoted by the addition of heat. The composition of the present disclosure may therefore in specific aspects have similarities to a supramolecular polymer.

In one embodiment of the present disclosure the composition is able to counteract rupture and/or fracture introduced by mechanical stress by, when reconnecting the surfaces of the rupture and/or fracture. The composition may accomplish this by reforming hydrogen bonds between parts otherwise broken by for example mechanical stress. As a result, a single unit can be formed having substantially the same mechanical and electrical properties as the composition prior to the rupture and/or fracture.

In one embodiment of the present disclosure the composition is self-healable with a healing efficiency, in terms of electrical and/or mechanical properties, of at least 40%, such as at least 50%, such as at least 60%, such as at least 70%, such as at least 80%, such as at least 90%, such as substantially 100%. Preferably, the composition is able to self-heal within a short amount of time, such as less than 10 minutes, such as less than 5 minutes, such as less than 3 minutes, such as less than 2 minutes such as less than 1 minute.

Self-healing efficiency is herein defined as the ratio of a recovered property value to its original value (the percent recovery of a virgin material property).

In one embodiment of the present disclosure the composition is therefore able to self-heal its electrical properties, such that an elongated structure having a certain resistance between its endpoints, substantially depending on the shape and the resistivity of the composition, may be cut perpendicular to its axial length, such that there is no electrical contact between its original two endpoints. Upon re-contacting the surfaces of the cut, the composition may be self-healed wherein the resistance is restored to a significant degree. The same mechanism for self-healing may hold true for restoring the mechanical properties of the composition.

The healing efficiency may be based on the electrical properties, such as the resistance, the mechanical properties, such as the fracture toughness, the tensile strength, the compressive strength, the impact strength, the tear strength, the flexural strength, the strain energy, the Young's modulus, across the boundary of a previous cut of the composition.

Bioproperties

In one embodiment of the present disclosure the composition is biocompatible. The constituents of the composition are thereby selected such that they may be used in order to form a biocompatible composition. Biocompatibility may refer to the quality of not having toxic or injurious effects on biological systems. In specific embodiments of the present disclosure, biocompatibility is instead referred to as the ability of a material to perform with an appropriate host response in a specific application.

Naturally derived polymers in general offer several advantages compared to synthetic polymers, namely biocompatibility, biodegradability, and biological activity, as most of them are present in the structural tissues of living organisms. However, they typically display low mechanical strength and high rates of degradation.

In one embodiment of the present disclosure the composition possesses antibacterial properties. This may be a result of the incorporation of substances into the composition which have known antibacterial properties, such as tannins. Antibacterial properties may be a result of, for example, inhibition of extracellular microbial enzymes, deprivation of the substrates required for microbial growth, direct action on microbial metabolism through inhibition of oxidative phosphorylation or iron deprivation.

Mechanical Properties

The composition of the present disclosure unexpectedly possesses several highly sought after advantageous mechanical properties. For example the composition may be surprisingly stretchable before rupture, i.e. the composition has a high elongation at break. Therefore, in one embodiment of the present disclosure the composition is stretchable to a length of at least 5 times the original length before rupture, more preferably at least 10 times the original length before rupture, yet more preferably at least 20 times the original length before rupture, yet even more preferably at least 30 times the original length before rupture, once even more preferably at least 40 times the original length before rupture, such as at least 50 times the original length before rupture, such as at least 60 times the original length before rupture, such as at least 70 times the original length before rupture, such as at least 80 times the original length before rupture, such as at least 80 times the original length before rupture, such as at least 90 times the original length before rupture, more preferably at least 100 times the original length before rupture, most preferably at least 200 times the original length before rupture. As such the composition may display a ductile behavior and/or strain softening under uniaxial tensile loading.

In one embodiment of the present disclosure the composition can tolerate to be stretched of up to 50%, preferably up to 75%, more preferably up to 100%, more preferably up to 125%, more preferably up to 150%, more preferably up to 200%, more preferably up to 300%, more preferably up to 400%, more preferably up to 500% of its original length by having a net resulting resistance change following the cycles, such as when the tensile force is released, of less than 10%.

In one embodiment of the present disclosure the composition can tolerate 2 stretch cycles of up to 50%, preferably up to 75%, more preferably up to 100%, more preferably up to 125%, more preferably up to 150%, more preferably up to 200%, more preferably up to 300%, more preferably up to 400%, more preferably up to 500% of its original length by having a net resulting resistance change following the cycles, such as when the tensile force is released, of less than 10%.

In one embodiment of the present disclosure the composition can tolerate 3 stretch cycles of up to 50%, preferably up to 75%, more preferably up to 100%, more preferably up to 125%, more preferably up to 150%, more preferably up to 200%, more preferably up to 300%, more preferably up to 400%, more preferably up to 500% of its original length by having a net resulting resistance change following the cycles, such as when the tensile force is released, of less than 10%. In one embodiment of the present disclosure the composition can tolerate 4 stretch cycles of up to 50%, preferably up to 75%, more preferably up to 100%, more preferably up to 125%, more preferably up to 150%, more preferably up to 200%, more preferably up to 300%, more preferably up to 400%, more preferably up to 500% of its original length by having a net resulting resistance change following the cycles, such as when the tensile force is released, of less than 10%.

In one embodiment of the present disclosure the composition displays non-Newtonian behavior. Non-Newtonian behavior may be shear thinning, which is the behavior of fluids whose viscosity decreases under shear strain. It is sometimes considered synonymous for pseudoplastic behavior. The non-Newtonian behavior may additionally or alternatively be due to time-dependent effects, such as thixotropy.

In one embodiment of the present disclosure the Young's modulus, at 22° C., is between 1 and 40 kPa, more preferably between 1 and 30 kPa, such as between 5 and 25 kPa, such as between 8 and 23 kPa, such as between 12 and 20 kPa, such as between 15 and 22 kPa, such as between 17 and 20 kPa. A high elasticity/flexibility (i.e. a low Young's modulus) offers significant benefits for certain applications. For example the composition may be deformed to a greater extent, with the same force applied, thereby allowing for more sensitive stress sensors. As a lower force is required in order to deform a higher elastic composition, an individual may use the composition as a stress sensor without noticing the presence of the sensor. It is a strong preference that the Young's modulus is relatively low. Therefore in an embodiment of the present disclosure, the Young's modulus is below 50 kPa, more preferably below 45 kPa, yet more preferably below 40 kPa, even more preferably below 35 kPa, yet even more preferably below 30 kPa, most preferably below 25 kPa, such as at room temperature (22° C.).

Young's modulus, or Young modulus, is a mechanical property that measures the stiffness of a solid material. It defines the relationship between stress (force per unit area) and strain (proportional deformation) in a material in the linear elasticity regime of a uniaxial deformation.

In one embodiment of the present disclosure the composition is attached to a support layer, wherein the support layer provides a higher yield strength than the composition. In this way, deformation to the composition is to a significant degree limited to elastic deformation at the relevant strain ranges, while the plastic deformation can be minimized, and preferably avoided, at the relevant strain ranges. The support layer may comprise or consist of a tape.

Printability

In one embodiment of the present disclosure the shear modulus at 40° C. is at least 2 times lower than the shear modulus at 20° C. More preferably at least 5 times lower, even more preferably at least 10 times lower, even more preferably at least 15 times lower, even more preferably at least 20 times lower, even more preferably at least 40 times lower, even more preferably at least 100 times lower, even more preferably at least 200 times lower.

This means that the composition is moldable. The composition may as such behave as a typical liquid at elevated temperatures. The composition may therefore have a temperature dependent shear modulus, wherein it significantly decreases upon application of heat, sufficient for successful molding of the composition to take place. The composition may for example be molded into substantially layered products, such as for application on a skin for registering movements and/or a stress sensor. The composition may further be molded into shapes such that the shaped composition matches the surface to which the composition is to be applied to, such as being curved for wherein the composition is to be applied to a heart.

In one embodiment of the present disclosure the composition can be extruded, such that it is suitable to be printed. Extrusion of the composition may be a result of an elevated temperature wherein the shear modulus has temporarily been decreased due to the application of heat. Printing may therefore be performed to print the composition in predefined patterns, in a single layer or in a three-dimensional configuration. Furthermore, the printing may be used in order to rapidly form multiple separate compositions, wherein the individual compositions may be substantially identical or may differ in terms of size, shape and/or the relative amount of constituents.

In one embodiment of the present disclosure the composition is configured to be printed, such as by extrusion printing or electrospinning, such as by melt electrospinning.

In one embodiment of the present disclosure the composition is configured such that it can form melt spun fibers. This may be carried out by wherein the composition is filled inside a plastic syringe with nozzle size of 1 mm and heated up to around 60° C. The fibers may thereafter be extruded into water bath at around 60° C. and cooled immediately after extrusion in order to keep a smooth fiber structure.

In another embodiment of the present disclosure the composition is configured such that it can be used in screen-printing. For example in a process wherein the composition may form patterns on a 0.5 mm thick plastic sheet (screen) by laser-cut using an Epilog laser-cutting machine. The patterned meshes may be fixed on a flat surface (PMMA plastic) and the composition may be screen printed using a squeegee blade after heating the samples at around 60° C. for 10 minutes.

Melt electrospinning relies on the same physics as electrostatic fiber drawing, the difference lies in the physical properties of the polymer melt, compared to a polymer solution. When comparing polymer melts and polymer solutions, the former are normally more viscous than polymer solutions. The molten electrified jet in general also requires cooling to solidify, while solution electrospinning in general relies on evaporation. Melt electrospinning typically produces micron diameter fibers, and may result in the path of the electrified jet being highly predictable, such that it is suitable for printing predetermined 2D and/or 3D features on a surface.

In one embodiment of the present disclosure the viscosity at a shear rate of 1/s and a temperature of T=50° C. is between 100 and 2000 Pa·s, more preferably between 200 and 1700 Pa·s, more preferably between 300 and 1500 Pa·s, more preferably between 500 and 1200 Pa·s, more preferably between 800 and 1000 Pa·s. In one embodiment of the present disclosure the viscosity at a shear rate of 1/s and a temperature of T=50° C. is between 100 and 2000 Pa·s, more preferably between 200 and 2000 Pa·s, more preferably between 300 and 2000 Pa·s, more preferably between 500 and 2000 Pa·s, more preferably between 800 and 2000 Pa·s, more preferably between 1200 and 2000 Pa·s, more preferably between 1500 and 2000 Pa·s, more preferably between 1800 and 2000 Pa·s.

In one embodiment of the present disclosure the viscosity at a shear rate of 1/s and a temperature of T=50° C. is between 100 and 2000 Pa·s, more preferably between 100 and 1700 Pa·s, more preferably between 100 and 1500 Pa·s, more preferably between 100 and 1200 Pa·s, more preferably between 100 and 1000 Pa·s, more preferably between 100 and 700 Pa·s, more preferably between 100 and 400 Pa·s, more preferably between 100 and 200 Pa·s.

Adhesive Properties

In one embodiment of the present disclosure the composition is tissue adherent. As such, the adhesive properties are preferably resistant to moisture.

Tissue adhesives must in general not only have sufficient adhesive and cohesive strength, but also the flexibility to comply with underlying tissue and the ability to retain these properties in moist or wet conditions. The swelling index should be low to prevent compression of nerves and blood vessels. Furthermore, the adhesive product should be easy to produce, store and apply.

In one embodiment of the present disclosure the adhesion strength to skin, bone, muscle and/or heart tissue, is between 1 and 50 kPa at a temperature between 20 to 40° C., such as between 1 and 50 kPa, such as between 2 and 50 kPa, such as between 5 and 50 kPa, such as between 10 and 50 kPa, such as between 20 and 50 kPa, such as between 30 and 50 kPa, such as between 40 and 50 kPa.

In one embodiment of the present disclosure the adhesion strength to skin, muscle or heart tissue, is between 1 and 50 kPa at a temperature between 1 to 40° C., such as between 1 and 40 kPa, such as between 1 and 35 kPa, such as between 1 and 30 kPa, such as between 1 and 25 kPa, such as between 1 and 20 kPa, such as between 1 and 15 kPa, such as between 1 and 10 kPa, such as between 1 and 5 kPa.

In one embodiment of the present disclosure the adhesion strength to brass, steel or glass, is between 1 and 300 kPa at a temperature between 20 to 40° C., such as between 1 and 300 kPa, such as between 10 and 300 kPa, such as between 40 and 300 kPa, such as between 80 and 300 kPa, such as between 120 and 300 kPa, such as between 180 and 300 kPa, such as between 240 and 300 kPa.

In one embodiment of the present disclosure the adhesion strength to brass, steel or glass, is between 1 and 300 kPa at a temperature between 20 to 40° C., such as between 1 and 250 kPa, such as between 1 and 210 kPa, such as between 1 and 170 kPa, such as between 1 and 140 kPa, such as between 1 and 110 kPa, such as between 1 and 80 kPa, such as between 1 and 50 kPa, such as between 1 and 20 kPa.

With the stress sensor being adherent to surfaces, such as metals, the composition may be used for protection of these surfaces. The composition may for example be applied to a surface, such as by printing, for protection against corrosion and/or other mechanisms of degradation of materials. The composition may in this embodiment of the present disclosure protect the surface by preventing gasses and/or radiation, such as ultraviolet radiation, to reach the surface.

A Stress Sensor

The present disclosure further relates to a stress sensor comprising:

- the supramolecular conductive composition as disclosed elsewhere herein; and
- at least two electrical contacts/conductors, configured for measuring stress and/or pressure.

The at least two electrical contacts may therefore be configured for contacting an electronic test equipment for measuring pressure and/or the strain of the composition. As the stress sensor may be configured to be sensitive to pressure it may therefore be able to measure pressure variations in the environment. The stress sensor may therefore be used substantially similar to a manometer or it may be configured for measuring the pulse, such as a pulse meter. The stress sensor may further be used to measure the blood pressure, preferably both the systolic and diastolic blood pressure values. The pressure changes in the blood may apply a force on the stress sensor such that a change in the resistance and/or voltage of the stress sensor is changed, whereby the values, such as the strain, the pulse and/or the blood pressure can be derived, as known by a person skilled in the art.

In an embodiment of the present disclosure, the stress sensor comprises a power source.

In an embodiment of the present disclosure, the stress sensor comprises an electrical measurement device, such as an Ohmmeter.

In an embodiment of the present disclosure, the stress sensor is configured to form an electrical circuit, for measurement of changes in the electrical property of the composition, such as changes in the resistance. The circuit may thereby comprise a power source, an electrical measurement device, and the composition.

In an embodiment of the present disclosure, the stress sensor comprises a power source and/or an electronic test equipment. It is a preference that the stress sensor is arranged such that it forms at least one electrical circuit. It is a further preference that the stress sensor is configured for measuring changes in an electrical property of the composition, such as changes in the resistance of the composition. Changes in the resistance of the composition may for example be measured between the points of the composition where the electrical contacts electrically connect to the composition. Preferably said points are located at endpoints of the composition, preferably maximally spaced apart in an axis along which stress/deformation is to be measured.

In one embodiment of the present disclosure, the composition is provided substantially as a layer. The layer may as such have a planar profile such that it can easily be applied to a planar surface. Alternatively, the composition may have a curved surface, such that it follows the profile, such as the curvature, of a measurement site, such as an internal organ, the backside of a hand, the skin covering joints.

In one embodiment of the present disclosure the composition is attached to a support layer. The support layer may be configured to provide structural support, such as by being less easily deformed than the composition. The support layer may further be configured, such as by comprising a specific material, to have a higher Yield strength, and may in such a way provide the composition with a restoring force, when the composition has been elongated past its elastic limit.

In one embodiment of the present disclosure two electrical contacts are configured for measuring electrical changes, such as changes to the resistance of the composition, such as the resistance of the composition between the electrical contacts, such as by being connected to an electronic test equipment for measuring the resistance, such as an Ohmmeter.

In one embodiment of the present disclosure the at least two electrical contacts are positioned at endpoints/endsurfaces of the composition, such as the two substantially most distanced endpoints or endsurfaces. The electrical contacts are preferably positioned at the ends of the composition, such that when the composition is stretched measuring the resistance change between the contacts results in substantially the largest possible resistance change given that specific deformation. Contrary, a composition having electrical contacts at its midpoint would not be able to be used in providing detailed information of the elongation/deformation of the composition to the same extent. Contacts located at the endpoints would be displaced the most, and hence a certain elongation/deformation of the composition gives rise to a larger variation in the electrical resistance between the electrical contacts.

A Stress Sensor Assembly

The present disclosure further relates to a stress sensor assembly comprising the stress sensor as disclosed elsewhere herein, further comprising an electronic test equipment for measuring the resistance, such as an Ohmmeter.

Method for Sensing Stress

The present disclosure further relates to a method for sensing stress, comprising:

- providing the stress sensor assembly as disclosed elsewhere herein;
- contacting the stress sensor to a measurement site, such as a surface of a skin of a human, such as covering a joint; and
- measuring changes to the resistance and/or the voltage; and
- comparing the measured values to known values, such as previously measured values, or calibration values, for deriving values of strain and/or pressure applied to the composition.

Preferably changes to the voltage and/or resistance of the stress sensor assembly, may be measured between electrical contacts, the changes may for example be a result of deformation of the composition, such as stretching of the composition. In one embodiment of the present disclosure the stress sensor assembly is configured for measuring a current in the stress sensor and/or a voltage difference between two points of the stress sensor assembly, such as two points of the stress sensors. The measurements of the voltage and/or the current may thereafter be used for deriving the stress and/or the pressure exerted on the stress sensor. The derivation of the stress and/or the pressure may be performed on a remote processing unit, such as a computer or a smartphone. The stress sensor assembly may therefore further be configured for transmission of measurement values to the remote processing unit. The stress sensor assembly may comprise a unit for wireless transmission of data to the remote processing unit, such as by Bluetooth. The resistance change and/or the voltage difference may thus be continuously monitored by the stress sensor and wirelessly transmitted to the remote processing unit for derivation of the stress and/or pressure values. The analysis and modulation of the signal data performed by the remote processing unit may comprise noise evaluation, noise suppression, storing values at a predetermined interval, triggering of alarm based on predetermined levels and/or sending alarm message at predetermined levels of pressure and/or strain.

Items

The invention is described as numbered items in the following.

1. A supramolecular conductive polymer composition comprising;
   a polymer comprising repeating subunits comprising at least one functional group, for forming a part in a hydrogen bond, selected from alcohol, amine, ether, amide, carboxylic acid, ester, ketone, nitrile, aldehyde and carbamide;
   a polyphenol comprising a minimum of 12 aromatic hydroxyl groups;
   a solvent with a dielectric constant of at least 20; and an electrically conductive filler.
2. The composition according to any of the preceding items, wherein the polyphenol has a molecular weight between 500-4000 Da.
3. The composition according to any of the preceding items, wherein the polyphenol has between 2 and 40 gallic acid, pyrogallic acid, sinapoyl alcohol, coniferyl alcohol or paracoumaryl alcohol moieties.
4. The composition according to any of the preceding items, wherein the polyphenol comprises between 2 and 28 aromatic rings.
5. The composition according to any of the preceding items, wherein the polyphenol has between 1 and 40 hydrogen bond groups.
6. The composition according to any of the preceding items, wherein the polyphenol has between 1 and 40 hydrogen bond acceptor groups.
7. The composition according to any of the preceding items, wherein the polyphenol has between 1 and 40 hydrogen-bond donor groups.
8. The composition according to any of the preceding items, wherein the polyphenol is tannic acid.
9. The composition according to any of the preceding items, wherein the polyphenol is extracted from natural sources, such as wine, oak, tea, grapes, olives and/or oil, such as olive oil.
10. The composition according to any of the preceding items, wherein the polymer has a molecular weight between 10 and 1500 kDa.
11. The composition according to any of the preceding items, wherein the polymer has between 1 and 7 hydrogen-bond acceptor groups per repeated subunit.
12. The composition according to any of the preceding items, wherein the polymer has between 1 and 7 hydrogen-bond donor groups per repeated subunit.
13. The composition according to any of the preceding items, wherein the polymer has been subjected to an oxidation treatment, such as by treatment by acid and/or oxygen plasma, for formation of functional groups for forming part in a hydrogen bond.
14. The composition according to any of the preceding items, wherein the polymer is selected from the list including natural silk, synthetic silk, fibroin, starch, dextran, chitosan, polyvinyl alcohol, pectin, poly(ethylene glycol) diacrylate, polyacrylamide, polyethylene glycol or a mixture thereof.
15. The composition according to any of the preceding items, wherein the polymer comprises fibroin in β-sheet formation, at between 10 and 70% of the total length of the polymer.
16. The composition according to any of the preceding items, wherein the solvent is water.
17. The composition according to any of the preceding items, wherein the electrically conductive filler is selected from the list including graphene, intrinsically conducting polymers such as Polyaniline, Polypyrrole, Poly(3,4-ethylenedioxythiophene) and/or polystyrene sulfonate, iron ions, 2D transition metal carbides, carbonitrides, nitrides, MXenes, nanoclays such as bentonite, kaolinite, hectorite, halloysite, and/or montmorillonite, and/or elongated carbon nanostructures, such as carbon nanotubes.
18. The composition according to any of the preceding items, wherein the conductivity of the composition is between 1×10-6 and 1×10-1 S/cm
19. The composition according to any of the preceding items, wherein the composition is configured such that strain can be measured by a change in its electrical resistance.
20. The composition according to any of the preceding items, wherein the composition comprises between 10 and 60 wt. % of the polymer.
21. The composition according to any of the preceding items, wherein the composition comprises between 10 and 70 wt. % of the polyphenol.
22. The composition according to any of the preceding items, wherein the composition comprises between 10 and 90 wt. % of the solvent.
23. The composition according to any of the preceding items, wherein the composition comprises between 0 and 50 wt. % of the conductive filler.
24. The composition according to any of the preceding items, wherein the weight ratios between the polymer, the polyphenol, the solvent and the conductive filler are within the intervals 10-60:10-90:10-90:0.1-30 respectively.
25. The composition according to any of the preceding items, wherein the composition additionally comprises a salt, such as calcium chloride, magnesium chloride and/or lithium chloride.
26. The composition according to any of the preceding items, wherein the composition comprises between 0 and 20 wt. % of the salt.
27. The composition according to any of the preceding items, wherein the weight ratios between the polymer, the polyphenol, the solvent, the conductive filler and the salt are within the intervals 10-60:10-70:20-90:0-30:0-20 respectively.
28. The composition according to any of the preceding items, wherein the composition is able to counteract rupture and/or fracture introduced by mechanical stress by, when reconnecting the surfaces of the rupture and/or fracture, reforming hydrogen bonds between parts otherwise broken by such mechanical stress, such that a single unit can be formed having substantially the same mechanical and electrical properties as the composition prior to the rupture and/or fracture.
29. The composition according to any of the preceding items, wherein the composition is self-healable with a healing efficiency, in terms of electrical and/or mechanical properties, of at least 40%.
30. The composition according to any of the preceding items, wherein the composition is biocompatible.

31. The composition according to any of the preceding items, wherein the composition is biodegradable.
32. The composition according to any of the preceding items, wherein the composition has antimicrobial properties.
33. The composition according to any of the preceding items, wherein the composition can be stretched to a length of at least 5 times the original length before rupture.
34. The composition according to any of the preceding items, wherein the composition can reversibly stretch up to 200% of its original length without losing its electrical properties.
35. The composition according to any of the preceding items, wherein the composition displays shear-thinning viscoelastic properties.
36. The composition according to any of the preceding items, wherein the Young's modulus, at room temperature, is between 1 and 30 kPa.
37. The composition according to any of the preceding items, wherein the shear modulus at 40° C. is at least 100 times lower than the shear modulus at 20° C.
38. The composition according to any of the preceding items, wherein the composition is moldable.
39. The composition according to any of the preceding items, wherein the composition is configured to be printed, such as by extrusion printing or melt electrospinning.
40. The composition according to any of the preceding items, wherein the viscosity at a shear rate of 1/s and a temperature of T=50° C. is between 100 and 2000 Pa·s.
41. The composition according to any of the previous items, wherein the composition can tolerate 2 stretch cycles of up to 50%, by having a net resulting resistance change following the cycles, such as when the tensile force is released, of less than 10%.
42. The composition according to any of the preceding items, wherein the composition is tissue adherent.
43. The composition according to any of the preceding items, wherein the adhesion strength to skin, muscle, bone or heart tissue, is between 1 and 50 kPa at a temperature between 20 to 40° C.
44. The composition according to any of the preceding items, wherein the adhesion strength to brass, steel or glass, is between 10 and 300 kPa at a temperature between 20 to 40° C.
45. A stress sensor comprising:
the composition according to any of items 1-44; and
at least two electrical contacts, configured for measuring stress and/or pressure.
46. The stress sensor according to item 45, wherein the composition is provided as substantially a layer.
47. The stress sensor according to any of items 45-46, wherein the composition is attached to a support layer.
48. The stress sensor according to any of items 45-47, wherein the at least two electrical contacts are positioned at endpoints/endsurfaces of the composition, such as the two substantially most distanced endpoints or endsurfaces.
49. The stress sensor according to any of items 45-48, wherein the two electrical contacts are configured for measuring electrical changes, such as changes to the resistance of the composition, such as the resistance of the composition between the electrical contacts, such as by being connected to an electronic test equipment for measuring the resistance, such as an Ohmmeter.
50. A stress sensor assembly comprising the stress sensor according to any of items 45-49, wherein the stress sensor is further configured for measuring a current in the stress sensor and/or a voltage difference between two points of the stress sensor.
51. The stress sensor assembly according to item 50, further comprising means for transmitting data to a remote processing unit, such as a computer or a mobile phone, for processing of the measurement data.
52. A method for sensing stress, comprising:
providing the stress sensor assembly according to any of items 50-51;
attaching the stress sensor to a measurement site, such as a surface of a skin of a human covering a joint; and
measuring changes to the resistance and/or the voltage; and
comparing the measured values to known values, such as previously measured values, or calibration values, for deriving values of strain and/or pressure applied to the composition.
53. A method for making the supramolecular conductive polymer composition according to any of items 1-44, comprising mixing a formulation comprising;
a polymer comprising repeating subunits comprising at least one functional group, for forming a part in a hydrogen bond, selected from alcohol, amine, ether, amide, carboxylic acid, ester, ketone, nitrile, aldehyde and carbamide;
a polyphenol comprising a minimum of 12 aromatic hydroxyl groups;
a solvent with a dielectric constant of at least 20; and
an electrically conductive filler.
54. The composition formulation according to item 53, wherein said formulation comprises between 10 and 60 wt. % of the polymer.
55. The composition formulation according to any of items 53-54, wherein said formulation comprises between 10 and 70 wt. % of the polyphenol.
56. The composition formulation according to any of items 53-55, wherein said formulation comprises between 10 and 90 wt. % of the solvent.
57. The composition formulation according to any of items 53-56, wherein said formulation comprises between 0 and 50 wt. % of the conductive filler.
58. The composition formulation according to any of items 53-57, wherein the weight ratios between the polymer, the polyphenol, the solvent and the conductive filler are within the intervals 10-60:10-90:10-90:0.1-30 respectively.
59. The composition formulation according to any of items 1-58, wherein said formulation additionally comprises a salt, such as calcium chloride, magnesium chloride and/or lithium chloride.
60. The composition formulation according to any of items 53-59, wherein said formulation comprises between 0 and 20 wt. % of the salt.
61. The composition formulation according to any of items 53-60, wherein the weight ratios between the polymer, the polyphenol, the solvent, the conductive filler and the salt are within the intervals 10-60:10-70:20-90:0-30:0-20 respectively.

EXAMPLES

The invention will in the following be described with reference to the examples. The examples are exemplary and are intended to illustrate some of the features of the presently disclosed invention, and are not to be construed as limiting.

Example 1—Extraction of Silk Fibroin

Silk fibroin was extracted from Bombyx mori silk cocoons (Wild Fibres, UK). In a typical procedure, 5 g of cut cocoons was boiled in an aqueous solution (2 L) of 0.02 M sodium carbonate (Sigma-Aldrich) for 30 minutes. The obtained silk fibroin fibers were washed several times with MQ water and dried at room temperature for 24 hours. Then, the fibers were dissolved in 9.3 M lithium bromide (Honeywell) at 60° C. for 6 hours and dialyzed against MQ water for 3 days. Finally, the fibroin solution was centrifuged for 20 minutes (three times) at 12000 rpm and 4° C. to remove any impurities. The concentration of the silk fibroin in the solution was determined and typically the concentration was in the range of 6-7% w/v (60-70 mg/mL). The silk fibroin was thereafter used for formation of compositions as described herein.

Example 2—Preparation of Reduced Graphene Oxide

Initially, graphene oxide was synthesized by modified Hummer's method using graphite flakes (Sigma-Aldrich, cat #332461, 150 μm flakes). In this method, 3.0 g of graphite flakes was mixed with a 9:1 mixture of concentrated $H_2SO_4$/$H_3PO_4$ (360:40 mL, Sigma-Aldrich) and stirred well for 30 minutes. Then, 18.0 g of $KMnO_4$ powder (Sigma-Aldrich) was gradually added into the solution under constant stirring. The reaction was performed under an ice bath in order to prevent the high exothermic reaction. After the complete addition of $KMnO_4$, the reaction mixture was heated up to 55° C. and stirred for 3 days. Then, the reaction mixture was cooled to room temperature and poured into 400 mL ice. Afterwards 30% $H_2O_2$ was added dropwise under constant stirring until the color of the mixture turned to yellow and stirred overnight at room temperature. The reaction mixture was centrifuged for 30 minutes at a speed of 13000 rpm and solid GO was collected. The resulting solid material was washed 3 times with 0.1 M HCl and several times with MQ water until the measured pH of the supernatant was 5-6. Finally, the collected solid GO material was freeze-dried and used for reduced graphene oxide preparation. In order to reduce the graphene oxide, 300 mg of freeze dried GO was dissolved in 50 ml MQ water and sonicated for 90 minutes to obtain a uniform brown solution. Then, 400 mg of Tannic Acid in 50 ml MQ water was added into the homogeneous GO solution and sonicated again for 90 minutes. Finally, the reaction mixture was heated at 85° C. for 9 hours. The resulting solid material was then washed with 40 mL of MQ water and freeze-dried for 12 hours. The reduced graphene oxide (rGO) was thereafter used for formation of compositions as described herein.

Example 3—Preparation of Silk-Reduced Graphene Oxide (SiGo) Supramolecular Polymer Compositions Initially, stock solutions of 50% w/v tannic acid (TA, Sigma-Aldrich), 2M $CaCl_2$ and 2 mg/mL rGO were prepared. Required volumes of silk fibroin solution and $CaCl_2$ were measured and mixed together to reach the final content of 560 mg silk fibroin and 0.1 M $CaCl_2$, respectively. Subsequently, required volumes of graphene solutions (16, 33 and 70 mL) were mixed with the above mixture in order to reach a silk to graphene ratio of 5, 10 and 20% w/w and maintained the total volume as 80 mL by adding water. Finally, 5.6 ml of 50% w/v TA solution was gradually added to a stirring solution and mixed with spatula until complete formation of SiGo composition. A sample without conducting filler (SiGo-0%) and a control sample without salt and conducting filler were prepared using the same protocol for comparison. The prepared hydrogel was washed and kept for 24 hours in Milli-Q water prior to analysis. While the reduced graphene oxide may comprise derivatives of polyphenols, preparation of the composition thereby involves addition of further polyphenols (TA), that is not necessarily bound to the reduced graphene oxide. The compositions (apart from the control samples) had a constant weight ratio of silk fibroin (SF):Tannic acid (TA) at 1:5 and 0.1 M $CaCl_2$. This ration between SF and TA, and the amount of $CaCl_2$ was used for all examples shown herein.

Example 4—Characterization of SiGo Compositions: Scanning Electron Microscopy (SEM)

In order to observe the morphology of the SiGo compositions produced according to Example 3, the cross-sectional images of the freeze dried SiGo compositions were observed by a FEI Quanta 200 ESEM FEG Scanning Electron Microscope (USA) with a field emission gun, in which the accelerating voltage was kept at 5 kV and emission current at 5 mA. Prior to the SEM imaging, the freeze dried samples were cut and sputter coated with gold (5 nm). SEM images of SiGo compositions are shown in FIG. 1, where the porous nature of freeze-dried silk-tannic acid compositions (Control, FIG. 1A) with different composition of reduced graphene oxide (rGO), (FIG. 1B—0%, FIG. 1C 10%).

Example 5—Characterization of SiGo Compositions—Mechanical Properties

Figure 2:
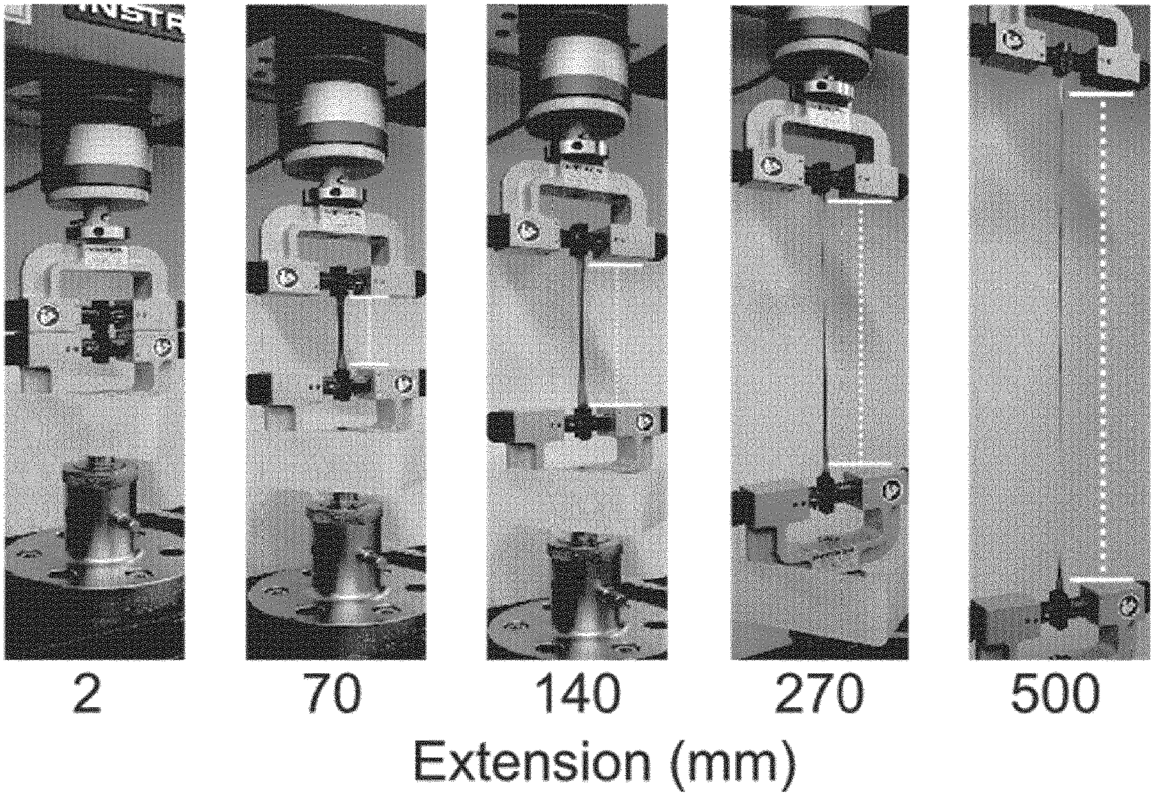
FIG. 2 shows the stretchability of a composition comprising silk and graphene (SiGo).
Figure 3:
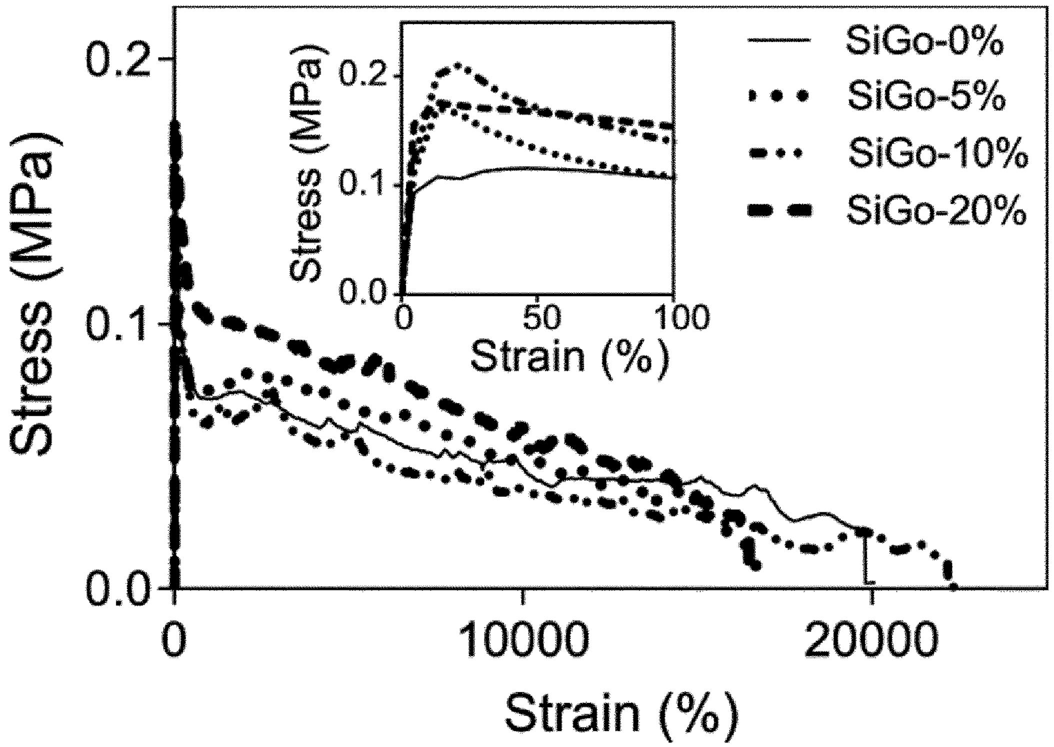
FIG. 3 shows a stress-strain curve of the various SiGo compositions.
Figure 4A:
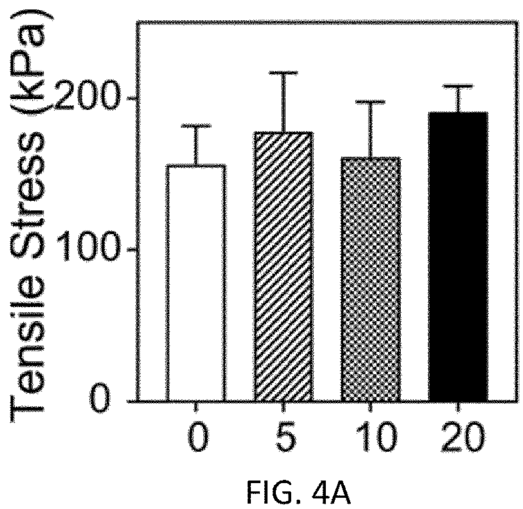
FIGS. 4A-B show curves of the maximum tensile stress and strain of compositions
Figure 4B:
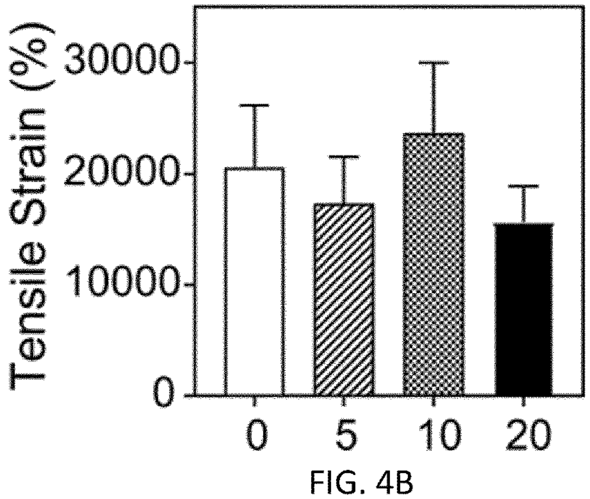

Mechanical properties of the SiGo compositions produced according to Example 3 were assessed with an Instron 5967 Universal Testing Systems (UK) in tensile and compression mode with 500 N load-cell, FIG. 2. To perform the tensile measurements, SiGo strips of 22 mm length, 14 mm width and approximately 1 mm thickness were prepared. Samples were strained at the rate of 100 mm $min^{-1}$ by keeping 2 mm gauge length until the failure point was reached. The thickness of each strip was measured independently using a digital electronic Vernier caliper before the test. To perform the compression test, SiGo compositions were molded into cylindrical shapes of 10 mm diameter and 5 mm height. Samples were compressed at the rate of 0.5 mm $min^{-1}$ until 70% compression achieved. The stress-strain curve (FIG. 3) was recorded using Bluehill 3 testing software and tensile strength (ultimate tensile stress) (FIG. 4A), tensile strain at break (also known as elongation at break) (FIG. 4B), Young's modulus (FIG. 5A) and compression stress (FIG. 5B) was determined. The samples showed that the graphene content impacted the mechanical properties of the composition. The observed stretching property for the composition increased from 20500% (toughness: 8.9±1.1 MJ m-3) to 24000% (toughness: 9.9±1.9 MJ m-3) with 10% rGO incorporation and then dropped to 15500% (toughness: 13.9±2.2 MJ m-3) for the highest rGO concentration, while the tensile strength seemed unaffected by rGO. A sharp three-fold increase in compressive strength from 287 to 820 kPa is seen as the rGO incorporation increased to 20%. Likewise, the young modulus increased four-fold from 5.7 to 21.7 kPa.

Example 6—Characterization of SiGo Compositions—Cyclic Tensile Test

Figure 7:
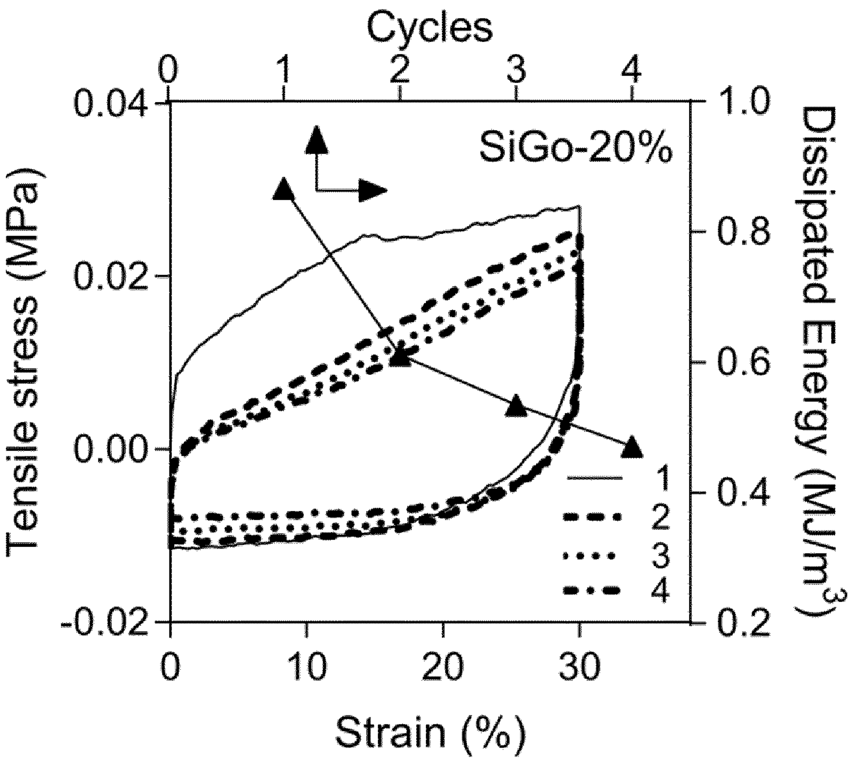
FIG. 7 shows cyclic tensile tests of SiGo-20%.
Figure 8:
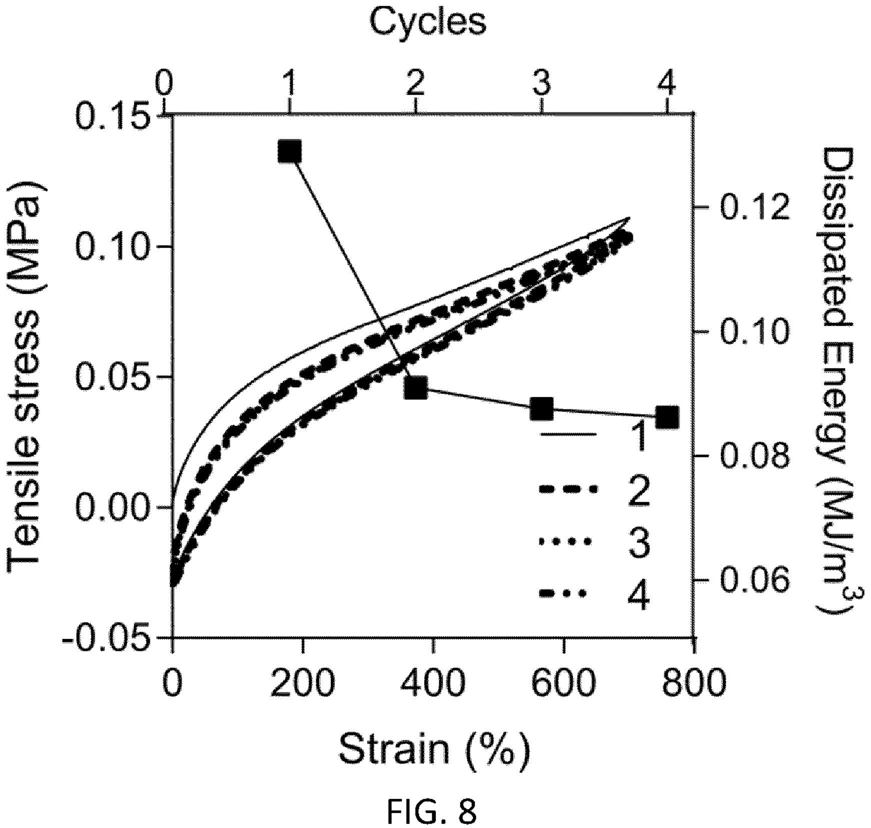
FIG. 8 shows cyclic tensile tests of SiGo-20% sealed within an acrylic foam tape (3M VHB).

Tests for mechanical properties of the SiGo compositions produced according to Example 3 were performed with an Instron 5967 Universal Testing Systems (UK) in tensile and compression mode with 500 N load-cell. Molded and flattened SiGo specimens of 25 mm length, 14 mm width and approximately 1 mm thickness were used for cyclic tensile measurements. The specimens were stretched up to 30% of the strain and in both loading and unloading cycles, the stretching was assessed at the rate of 10 mm $min^{-1}$ by keeping 5 mm gauge length. The thickness of each strip was measured independently using a digital electronic Vernier caliper before the test. The stress-strain curve was recorded using Bluehill 3 testing software. The strips were stretched four times, first stretch is given by the solid line, the second stretch by the dashed line, the third stretch by the dotted line and the fourth stretch by the dot-dash line. The area between the loading and unloading curves for each cycle was calculated and reported as energy dissipated per unit volume. The results show that pristine SiGo-0% (FIG. 6) dissipated energy much less effectively when compared to SiGo-20% samples (FIG. 7). Further, to improve cyclic stretching ability, the SiGo-20% samples were encapsulated in an acrylic foam tape (3M VHB) and the cyclic stretching measurements were performed as explained above, but until 600% of strain was reached (FIG. 8). In this case, the encapsulated specimen can be stretched up to 600% strain with much lower hysteresis and the dissipated energy becomes more stable after the first cycle.

Example 7—Water Content in the SiGo Compositions

The compositions produced according to Example 3 were not entirely hydrogels, neither were they completely solid, indeed they were more reminiscent of something in between—almost like a gum.

The water content of the compositions was determined by freeze drying the SiGo composition. The weights of the samples before (Wo) and after (VVd) freeze drying process were measured using a scale with an accuracy of 0.001 g, and water content (%) was subsequently calculated using the following equation:

$$\text{Water Content}\,(\%) = \frac{W_o - W_d}{W_o} \times 100$$

Figure 9:
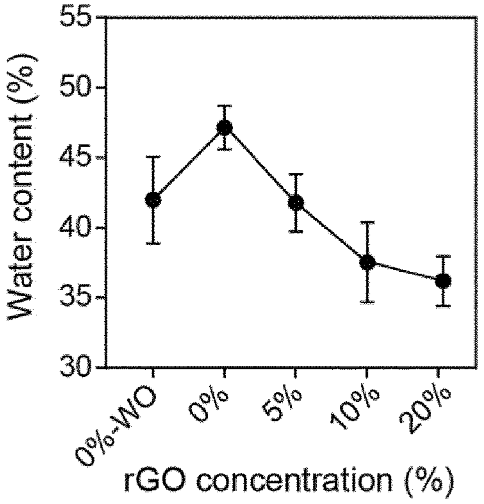
FIG. 9 shows measured water contents of SiGo-0%, SiGo-5%, and SiGo-10% compositions.

The water content in the composition was found to be decreased with an increasing amount of reduced graphene oxide (FIG. 9). With a water content decreasing from 47% to 36% as the rGO concentration reached 20% (FIG. 9). Similar to the other figures herein, the sample labelled "0%-WO" is 0% rGO and without salt ($CaCl_2$).

Example 8—Self-Healing Ability of the SiGo Compositions

Figure 10A:
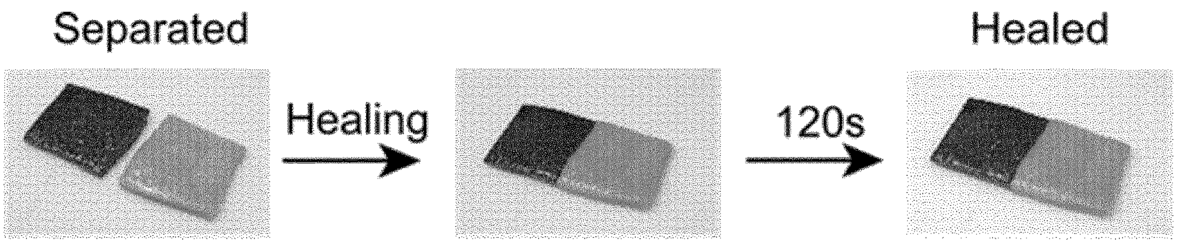
FIGS. 10A-B show the self-healing properties of the SiGo compositions.
Figure 10B:
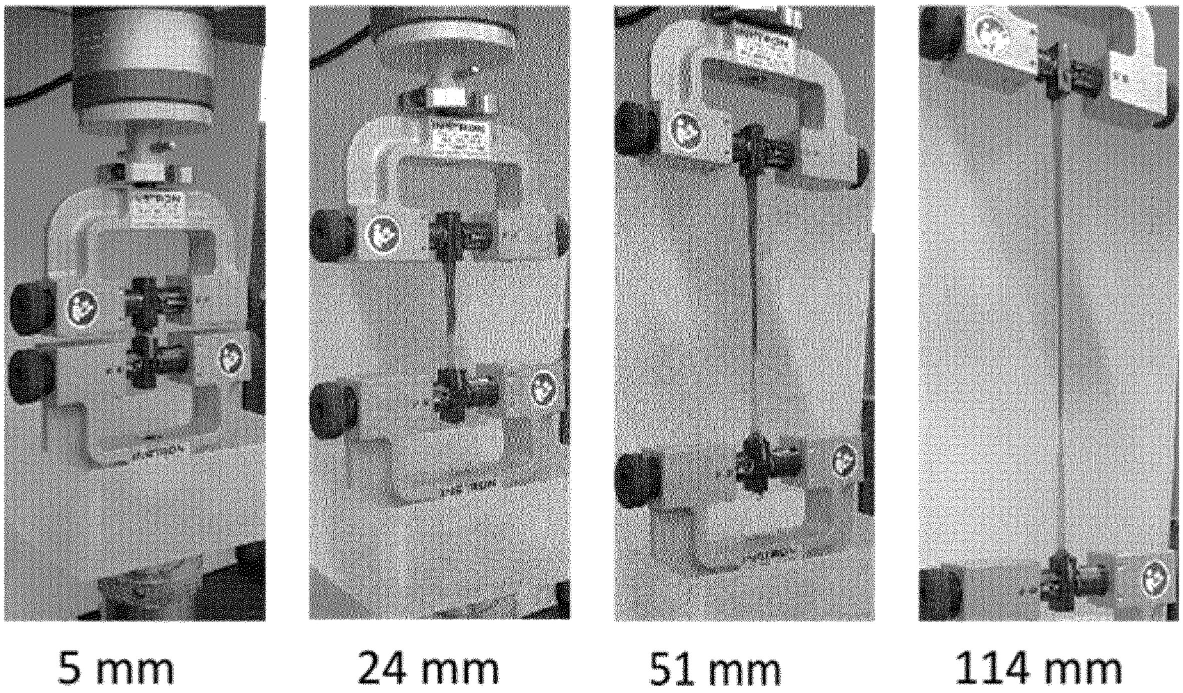
Figure 11:
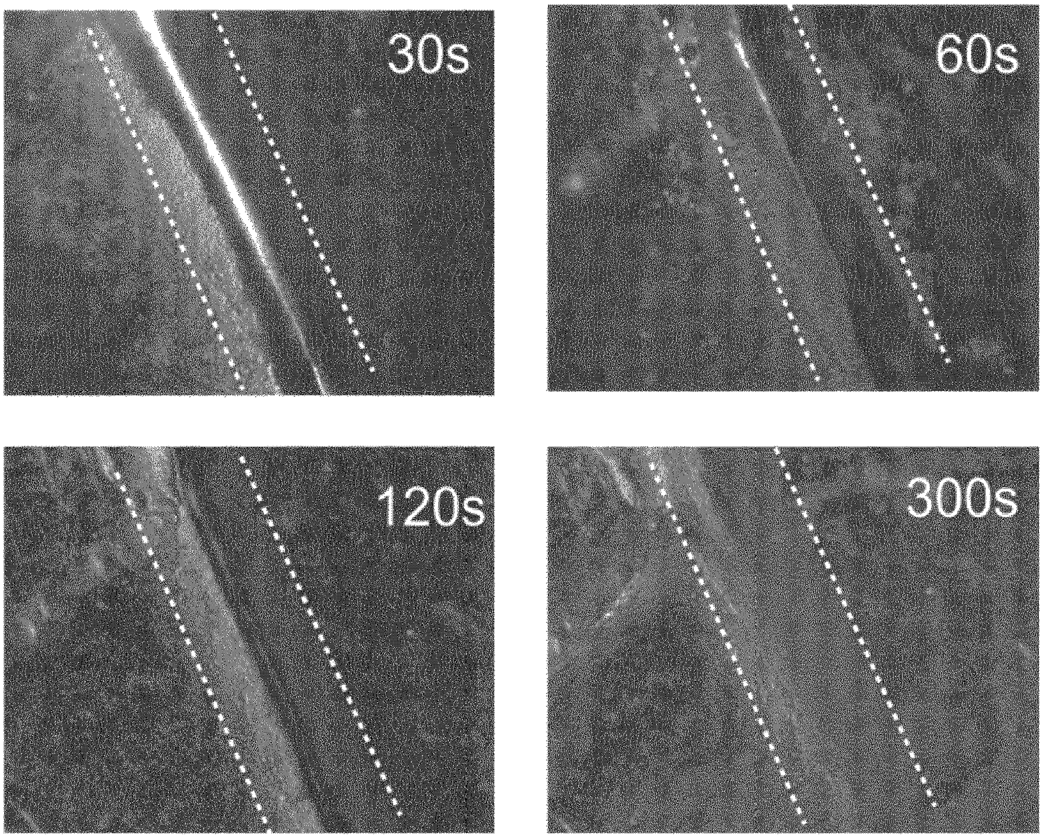
FIG. 11 shows a time-series of micrographs wherein the self-healing can be seen during a time interval of 300 seconds.

To characterize the self—healing properties of the SiGo compositions produced according to Example 3, the compositions were cut into two similar pieces, put together and allowed to heal at room temperature. All SiGo compositions healed within a few minutes and returned to their original shape (FIG. 10A). In order to differentiate the healing part, SiGo-0% and SiGo-20% were used in the example. After healing for 120 s, the specimen was strained at 100 mm $min^{-1}$ using an Instron 5967 Universal Testing System and the healed part remained intact after applying high mechanical strain (FIG. 10B). Optical microscopy images were taken at different time intervals to visualize the healing ability of the specimens (FIG. 11). The images clearly show that the initial gap was narrowed within 60 s, healed within 120 s and the scar completely disappeared after 300 s.

Example 9—Adhesiveness of the SiGo Compositions

Figure 12A:
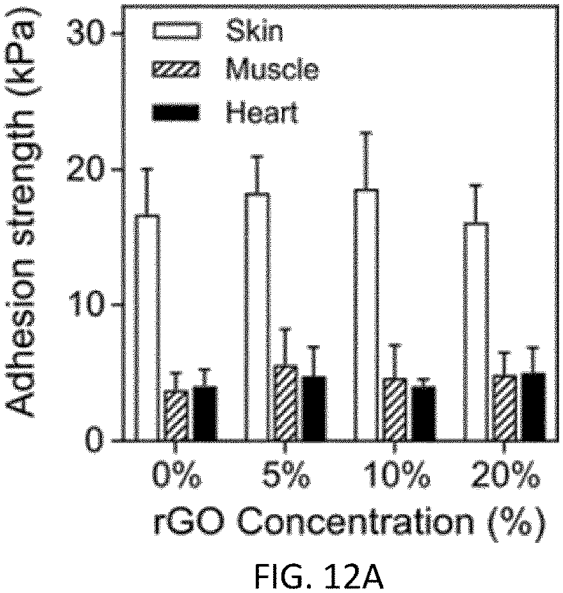
FIGS. 12A-B show the adhesive strength on various surfaces.
Figure 12B:
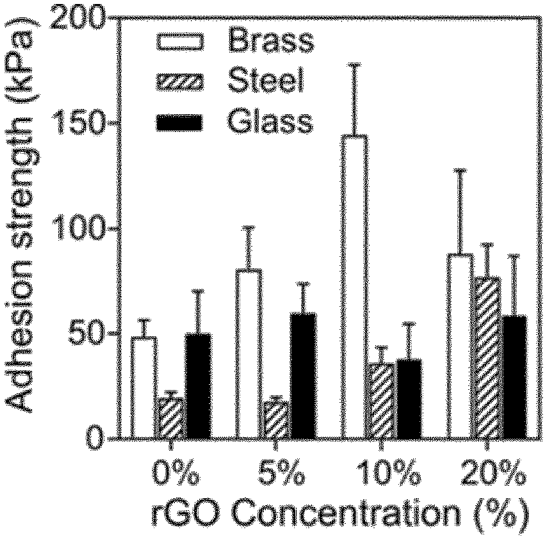

In order to show preliminary adhesive properties of the SiGo compositions produced according to Example 3, the samples were sandwiched between glass sheets of 1 mm thickness and a weight of 1 Kg during 10 min without forcing. A weight of 1 Kg could firmly adhere to the glass surface by the SiGo compositions. The sample could also adhere and hang the weight of 100 g directly to the human finger without introduction of curing agents or external aids. Lap shear strength experiments were used to determine the adhesive properties of SiGo system on porcine skin, heart and muscle surfaces, following the standard lap-shear test method (ASTM F2255) using Instron 5967 Universal Testing Systems (UK) in tensile mode with 500 N load-cell. The tissue samples with the dimensions of 10 mm×40 mm were adhered by the SiGo samples (10 mm×10 mm) and immersed in 37° C. PBS with 100 g weight applied during 10 minutes before testing (FIG. 12A). Similarly, the adhesive properties of SiGo samples were measured on the surface of steel, brass and glass sheet (FIG. 12B) with a bonding area of 12.7 mm×25.4 mm. The adhesion strength (Lap shear strength) was calculated as the maximum load divided by the bond area in kilo-Pascal (kPa). The adhesive strength of the SiGo systems on brass surfaces is higher than in the steel and glass surfaces. Furthermore, the adhesive strength of the SiGo compositions to porcine skin tissue is much higher than that of heart and muscle tissues. It is noteworthy that the results indicate that the rGO concentration is playing an important role in the adhesion strength of the SiGo system.

Example 10—Moldability of the SiGo Compositions

Figure 13A:
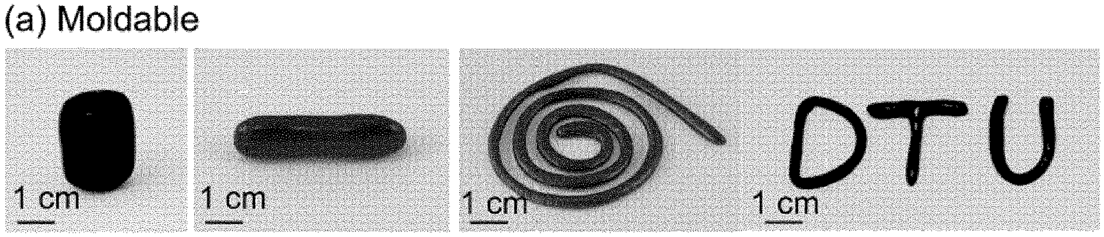
FIGS. 13A-C show photographic images of the moldability, conformability and printability of the composition SiGo-20% respectively.
Figure 13B:
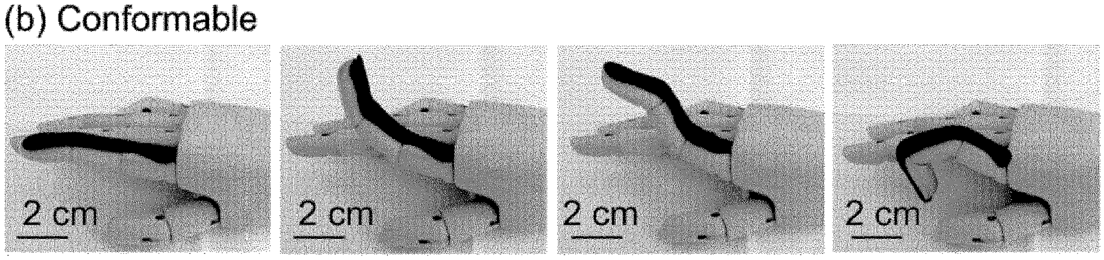
Figure 13C:
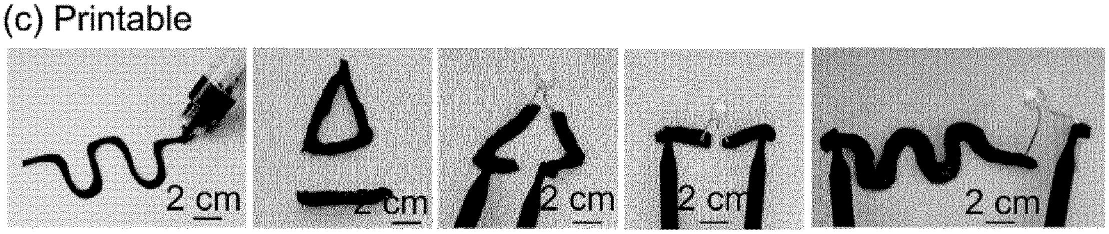

Another aspect of these homogeneous and stable SiGo compositions is that they can repeatedly mold into various 3D shapes as shown in FIG. 13A, displaying measurement results of compositions produced according to Example 3. Additionally, they can also mold and attach to any surface due to their adhesive nature. SiGo-20% is highly conformable to a humanoid prosthetic wooden hand (FIG. 13B). Furthermore, the viscosity of the supramolecular compositions can be decreased at elevated temperature which makes them printable, for example the SiGo-20% (FIG. 13C). Because of their conductive properties, they can be printed into various circuit structures for the application in electronics.

Example 11—Rheological Properties of the SiGo Compositions

Figure 14A:
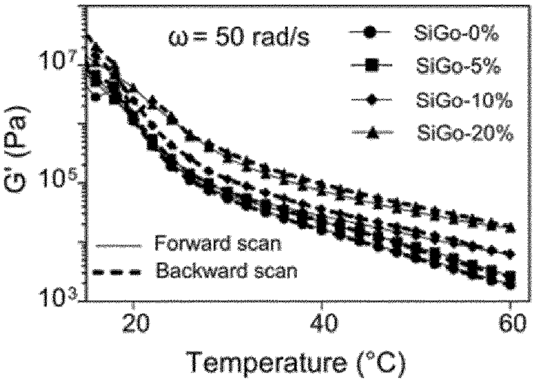
FIGS. 14A-C show the rheological measurements (A) Moldability, (B) viscosity and (C) shear thinning of SiGo Compositions.
Figure 14B:
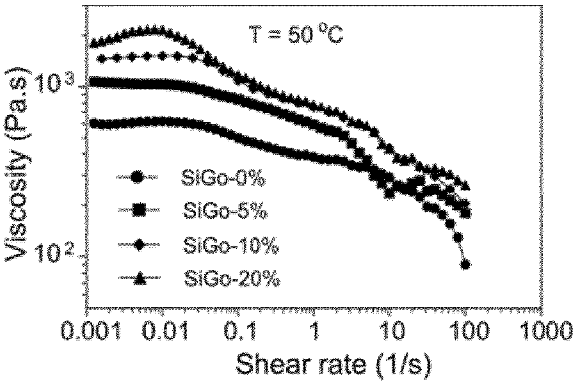
Figure 14C:
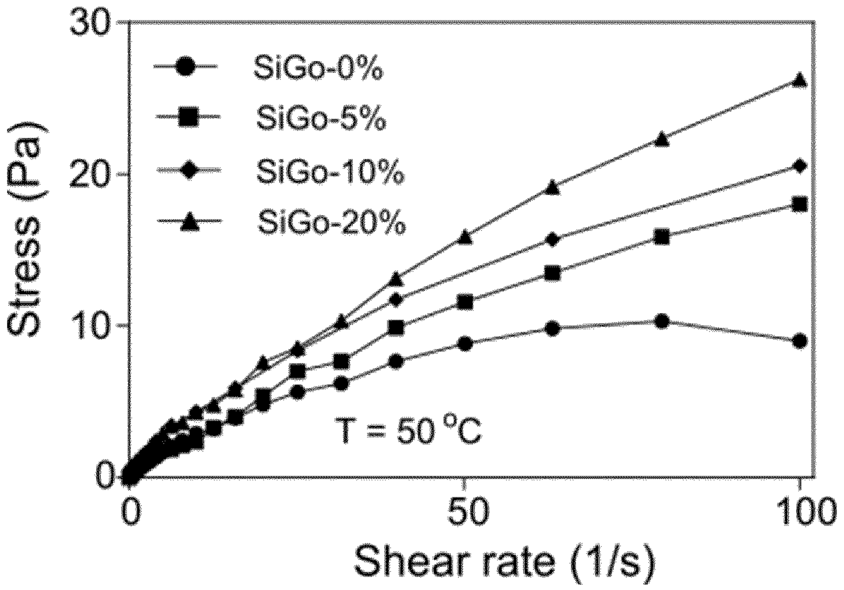

The viscoelastic behavior of SiGo compositions produced according to Example 3 was determined by Discovery Hybrid Rheometer HR-2, TA Instruments. Samples were loaded between two 20 mm diameter parallel plates with a 1 mm gap at T=25° C. Dynamic thermal-analysis was conducted by performing upwards and downward temperature ramps from 15° C. to 60° C. at a constant angular frequency (50 rad/s) and 1% strain. FIG. 14A shows storage modulus of the upward and downward temperature of different SiGo samples. The result shows that the storage modulus is decreased at higher temperatures and hysteresis is less pronounced, which indicates supramolecular compositions are stronger, stable and moldable at elevated temperatures. The shear viscosity of the SiGo compositions was then measured at 25° C. in a shear rate range from 0.1 to 100 $s^{-1}$. The viscosity response of SiGo compositions was concluded to be highly dependent on the shear rate and to exhibit more pronounced shear thinning properties at higher concentrations of rGO (FIG. 14B and C).

Example 12—Self-Healing Electronic Circuit

Figure 15A:
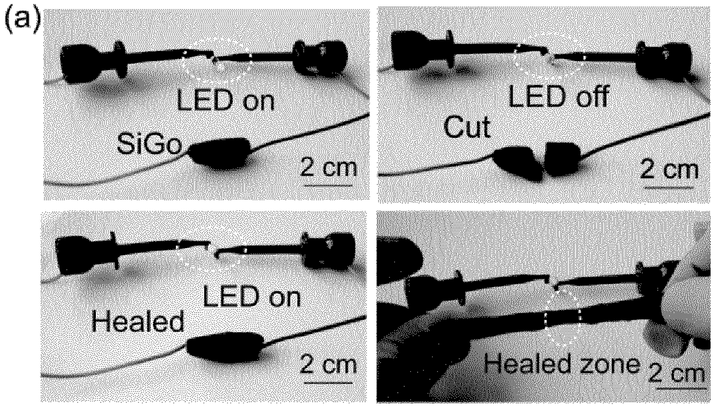
FIGS. 15A-B show the resistance changes while breaking and self-healing the circuit.
Figure 15B:
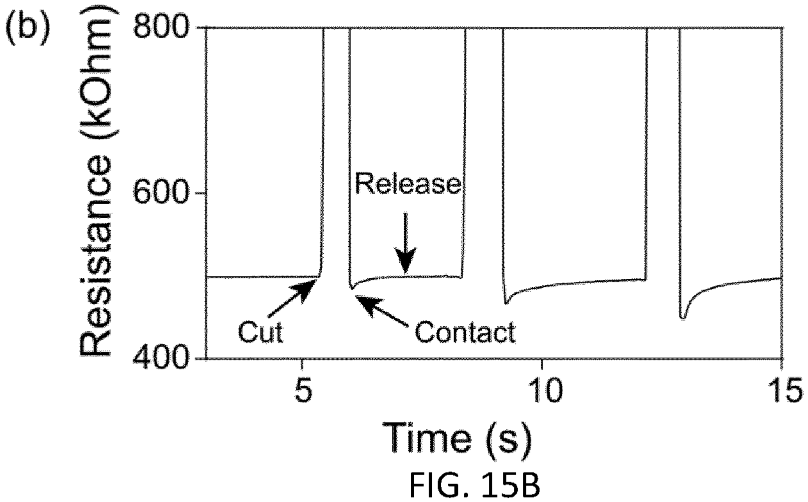

To further demonstrate the self-healing feature of the SiGo compositions, an electronic circuit was designed comprising a LED bulb (3-3.2V working load), SiGo compositions produced according to Example 3 as a conductor, and 3 dry batteries. The LED bulb was connected to the batteries through the SiGo conductor using copper wires. When the circuit was turned on, the bulb was lighted, indicating the higher conductivity of the SiGo compositions. Then, the self-healing ability of the sensor was demonstrated on the circuit as shown in FIG. 15A. The circuit becomes open and the LED bulb extinguished when the composition was cut and it lighted up again after self-healing the composition. The self-healed part remained intact even after stretching the circuit. The resistance of the SiGo sensor circuit was monitored with an Agilent 4294A precision impedance analyzer (USA) operated at 2 kHz by applying an AC voltage ranging from −0.5 to 0.5 V. The resistance was measured during multiple macroscopic damages and self-healing scenarios, where the resistance was recovered after self-healing as shown in FIG. 15B.

Example 13—Stretchable and Bendable Sensor

Figure 16A:
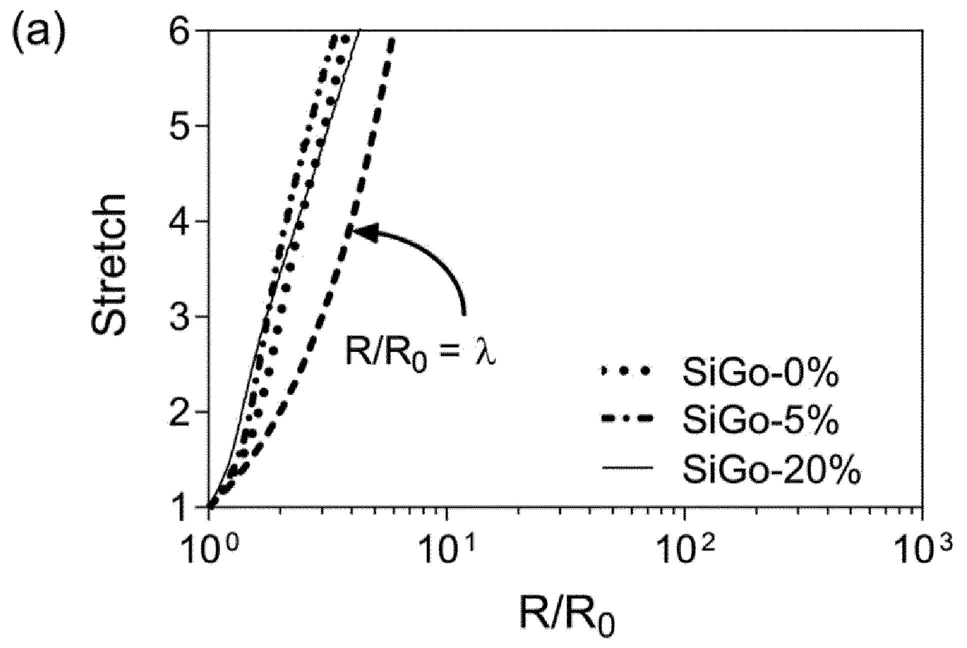
FIGS. 16A-B show the relative resistance changes while stretching and bending
Figure 16B:
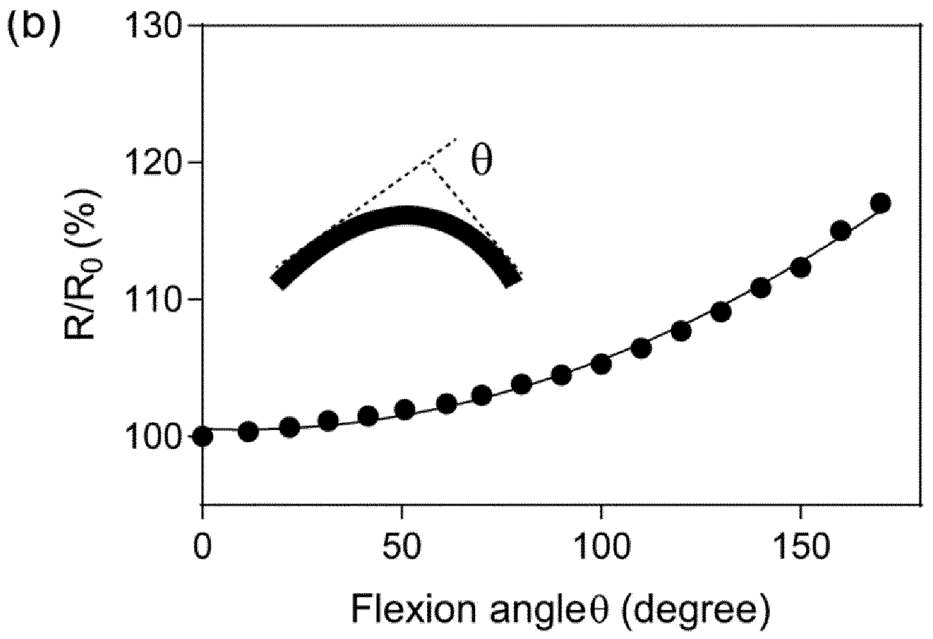

To measure the stretching and bending response of the compositions produced according to Example 3, a sensor was fabricated by connecting tin plated copper sheets to both ends of 5 mm-wide, 3 mm length and 1 mm thick SiGo rectangular strip. All sensors were encapsulated in an acrylic foam tape (3M VHB) to prevent the evaporation of water. The resistance changes in response to stretching was monitored with an Agilent 4294A precision impedance analyzer (USA) operated at 2 kHz by applying an AC voltage ranging from −0.5 to 0.5 V. Relative resistance ($R/R_0$) was then reported as the measured values, where R is the resistance at measuring scenarios and $R_0$ is the initial resistance. The relative resistance response of the SiGo compositions was directly proportional to the strain and bending angle as shown in FIG. 16A and FIG. 16B respectively.

Example 14—Cyclic Stretching Performance of the Sensor

Figure 17A:
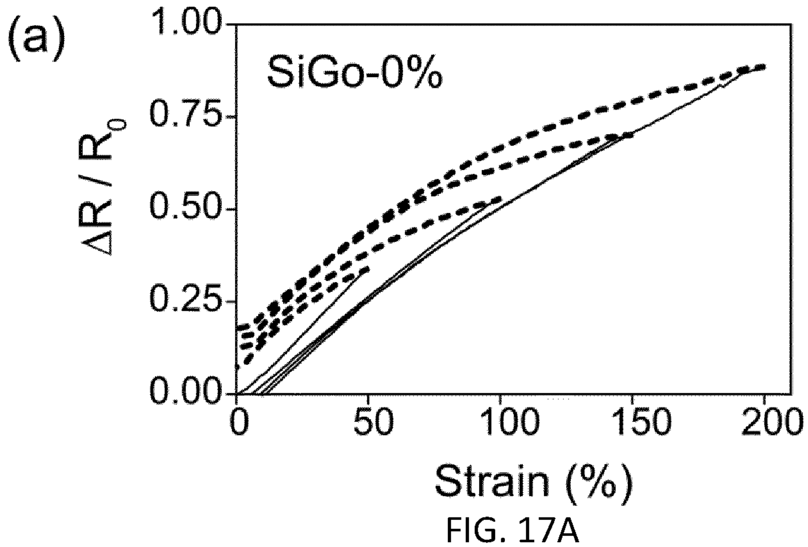
FIGS. 17A-C show the relative resistance change measurements of SiGo-0%, SiGo-5% and SiGo-20% while cyclic stretching up to strain 200%.
Figure 17B:
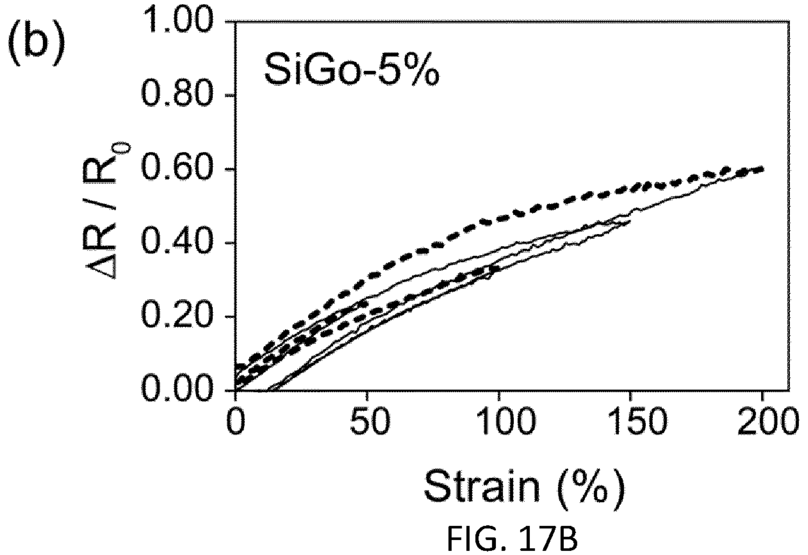
Figure 17C:
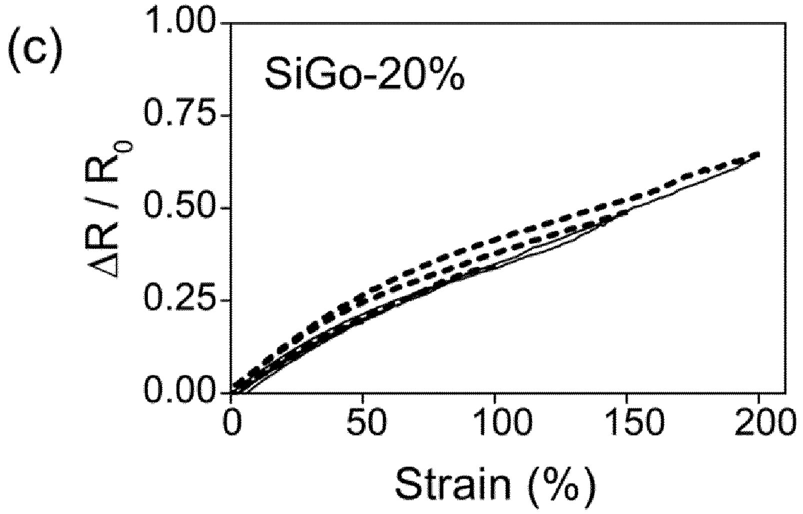

To measure the cyclic stretching response of the compositions produced according to Example 3, a sensor was fabricated by connecting tin plated copper sheets to both ends of 5 mm-wide, 3 mm length and 1 mm thick SiGo rectangular strip. The compositions of the strips comprised 0% rGO (FIG. 17A), 5% rGO (FIG. 17B) and 20% rGO (FIG. 17C). All sensors were encapsulated in an acrylic foam adhesive tape (3M VHB) to prevent the evaporation of water. The resistance changes in response to stretching was monitored with an Agilent 4294A precision impedance analyzer (USA) operated at 2 kHz by applying an AC voltage ranging from −0.5 to 0.5 V. Relative resistance ($\Delta R/R_0$) was then reported as the measured values, where $\Delta R$ is the difference between the resistance at measuring scenarios and the initial resistance ($R_0$).

Example 15—Sensor for Monitoring the Body Movements

Figure 18:
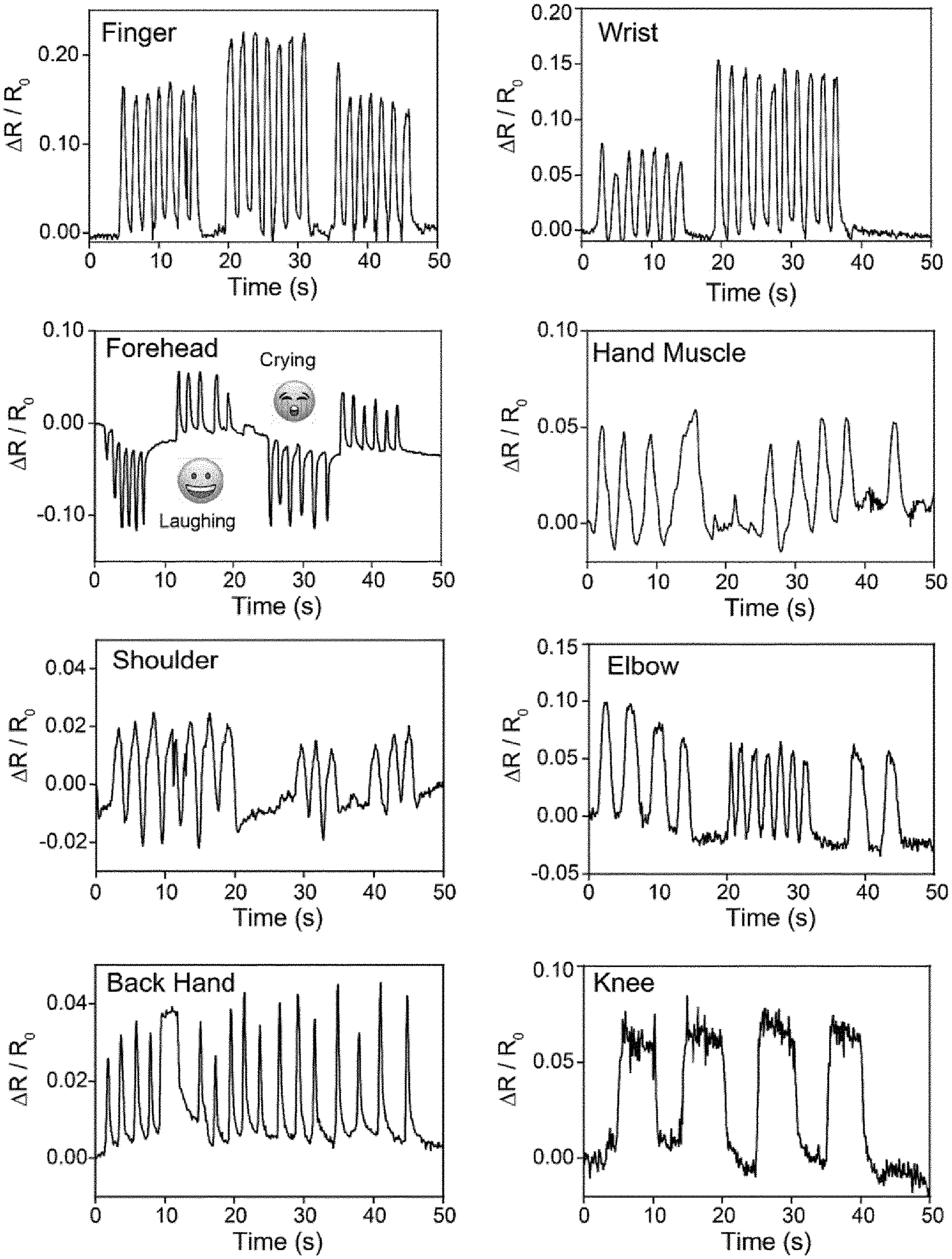
FIG. 18 shows the relative resistance change of a composition attached to various body parts during activation of muscles of that body part.

In order to monitor the movements of the body, a sensor comprising compositions produced according to Example 3 was fabricated by connecting tin plated copper sheets to both ends of a 5 mm-wide and 1 mm thicker SiGo rectangular strip. The length of the sensor varied from 3 to 6 cm in order to attach to various moving parts of the body such as finger, wrist, forehead, hand muscle, shoulder, elbow, back hand, and knee as shown in FIG. 18 respectively. All sensors were encapsulated in an acrylic foam adhesive tape (3M VHB) to prevent the water evaporation. The resistance changes in response to body movements were monitored with an Agilent 4294A precision impedance analyzer (USA) operated at 2 kHz by applying an AC voltage ranging from −0.5 to 0.5 V. Relative resistance ($\Delta R/R_0$) was then reported as the measured values, where $\Delta R$ is the difference between the resistance at measuring scenarios and the initial resistance ($R_0$). FIG. 18 shows the resistance change signals of the SiGo sensor depending on the body movements. The sensor could precisely track the fast movements of the body parts by monitoring the resistance changes. Moreover, the signal patterns are greatly dependent on the body parts and the sensor attached to the forehead can distinguish the signals of facial expressions such as laughing and crying.

Example 16—Chemical characterizations through Attenuated Total Reflectance-Fourier-Transform Infrared (ATR-FTIR) spectroscopy The compositions, produced according to example 3, were analyzed by ATR-FTIR spectroscopy, at different SF—rGO ratios (from 0 to 20 wt % nanomaterial loading), while keeping the constant weight ratio of SF:TA at 1:5 and 0.1 M $CaCl_2$.

Figure 19:
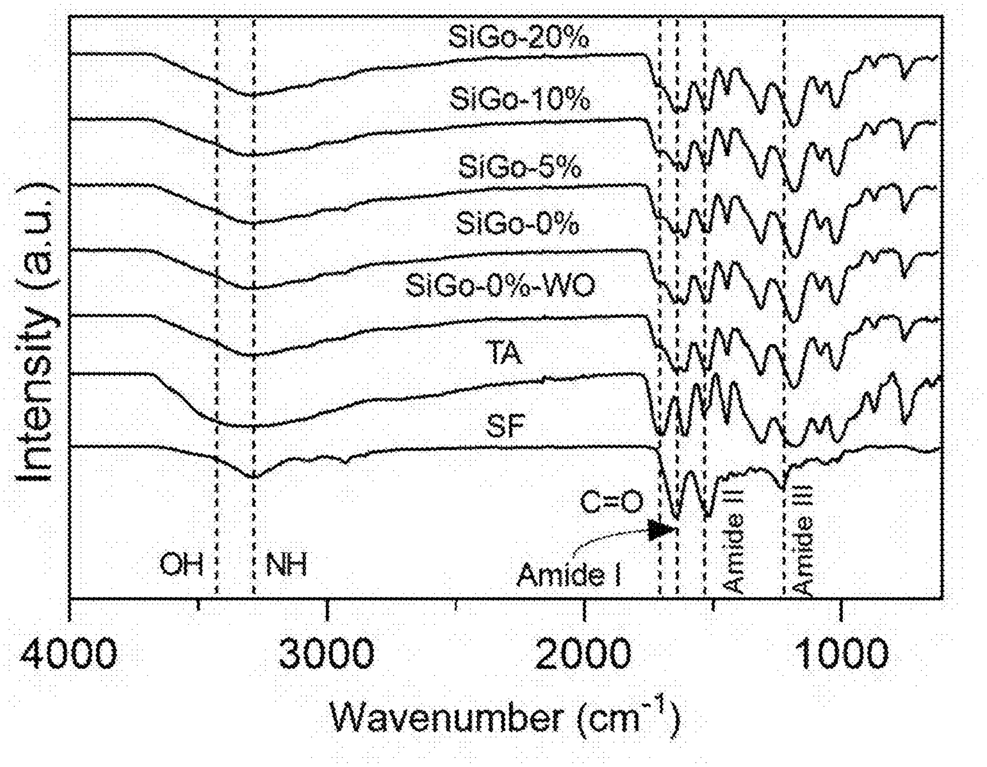
FIG. 19 shows FTIR spectra of pristine components and composites.
Figure 20:
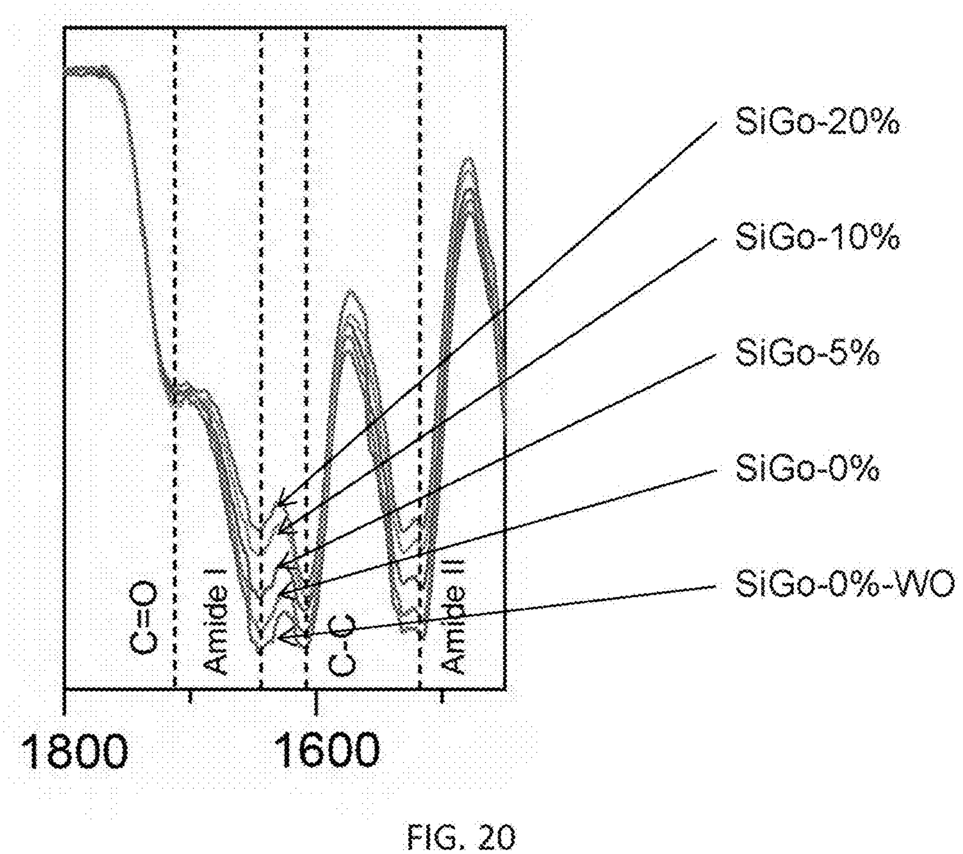
FIG. 20 shows an enlarged FTIR spectra of pristine components and composites.

As shown in the FIG. 19, and further in FIG. 20, the FTIR spectra of the composition samples exhibit prominent signature peaks associated with silk (amide I (1642 $cm^{-1}$), amide II (1515 $cm^{-1}$), amide III (1235 $cm^{-1}$)) and TA (C═O stretching (1698 $cm^{-1}$), C—C stretching (1609 $cm^{-1}$), C—O—C stretching (1308 $cm^{-1}$)). Specifically, the composite showed a wavenumber shift of the TA associated hydroxyl group (OH) centered at 3400 $cm^{-1}$ and the amide (NH) associated peak of silk centered at 3290 $cm^{-1}$ to 3323 $cm^{-1}$.

These shifts indicate the presence of a multitude of hydrogen bonding schemes between TA and SF of varying strength ranging from $OH_{SF}$ . . . $OH_{TA}$ (4.7 kcal/mol), $NH_{SF}$ . . . $OH_{TA}$ (7.4 kcal/mol), and $OH_{TA}$ . . . C═$O_{SF}$ (4.6 kcal/mol).[14] In addition, the peak at 1698 $cm^{-1}$, magnified in FIG. 20, corresponding to the carbonyl group (C═O) of TA is shifted to 1713 $cm^{-1}$ confirming the weak interaction between silk and TA through $NH_{SF}$ . . . C═$O_{TA}$ (3.9 kcal/mol) hydrogen bond formation. From FTIR we can also examine possible electrostatic interactions between positively charged calcium ($Ca^{2+}$) ions with negatively charged amino acids ($COO^-$) such as glutamate and aspartate within the SF chain. This interaction did not make a significant change in the peak position of amide peaks, howbeit a decreased intensity of the amide I (1642 $cm^{-1}$) and amide II (1515 $cm^{-1}$) of SF were observed, which typically are associated with structural changes occurring in the backbone of the SF chain via the electrostatic interactions with $Ca^{2+}$ ions. Similar to the other figures herein, the sample labelled "0%-WO" is 0% rGO and without salt ($CaCl_2$).

A decrease in intensity corresponding to the amide I and amide II bands within the SF spectra can be seen after rGO inclusion, attributed to conformational changes occurring in the secondary structure of SF due to surface interactions with rGO. These conformational changes in the molecular level of SF impacts the mechanical properties such as toughness and stiffness, and consequently, the amide I spectra in the 1571-1800 cm-1 region is determined to elucidate the secondary structures present in the silk fibroin of the composition.

Figure 21:
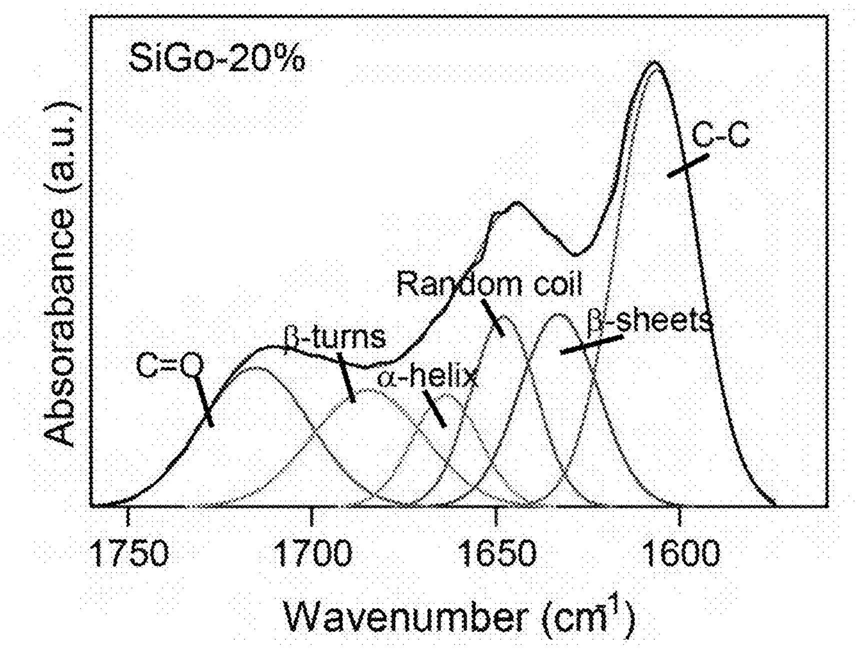
FIG. 21 shows an enlarged FTIR spectra with secondary structures of a composition comprising 20% rGO and $CaCl_2$.
Figure 22:
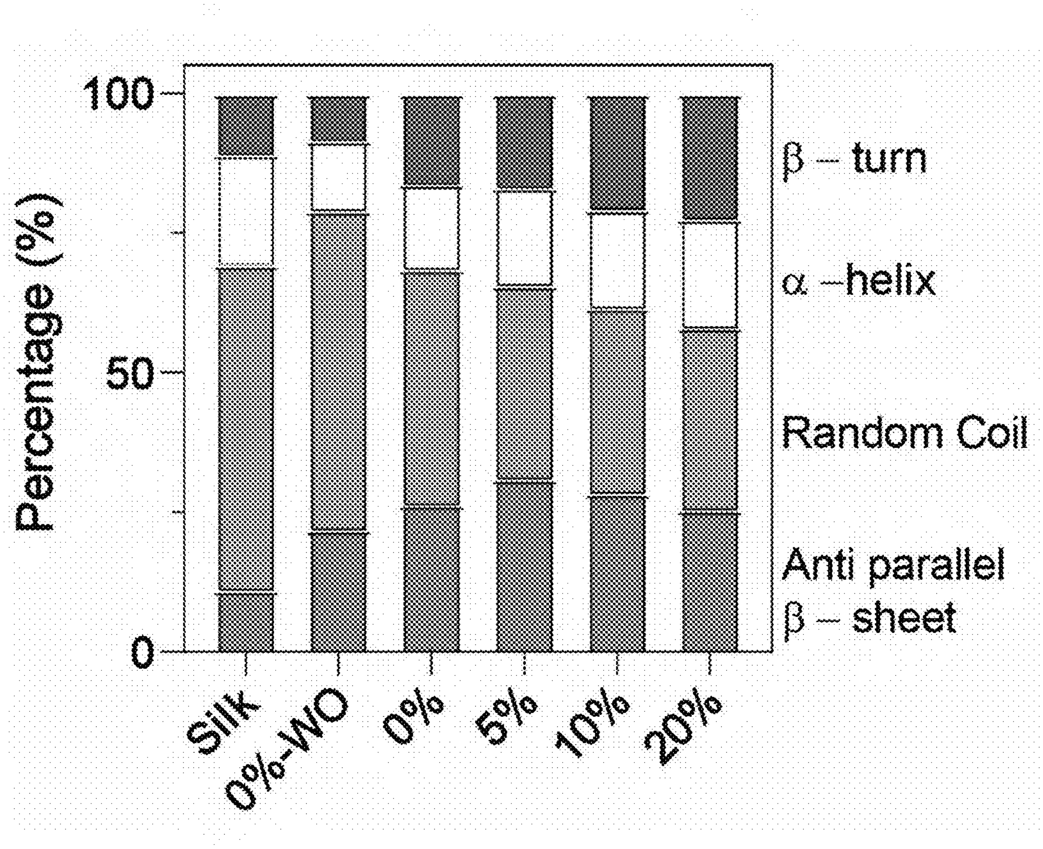
FIG. 22 shows distributions of secondary structures for various samples of the composition.

The secondary structures of each sample could thereby be measured. FIG. 21 shows exemplary measurement data for the sample comprising 20 wt. % rGO. Similar measurements data were retrieved for all samples. The resulting data is summarized in FIG. 22. Similar to the other figures herein, the sample labelled "0%-WO" is 0% rGO and without salt ($CaCl_2$). Four secondary structures were identified and quantified, including β-sheets, random coils, β-helices, and β-turn structures. β-sheets are crystalline structures formed by interpeptide antiparallel hydrogen bonded strands—linked to material stiffness and toughness—while β-turns arise from the transformation of loose hairpin structures into tight turns and associated with an increase in sample elasticity. From the results it can be concluded that the addition of TA and $CaCl_2$ increased the β-sheets and β-turn structures (together 42%) compared to pristine silk (22%) and SiGo without $CaCl_2$ samples (30%). The nanoreinforcement of the composition with graphene further increased the percentage of β-structures to 49% at the highest rGO concentration.

The invention claimed is:

1. A supramolecular conductive polymer composition comprising;

a polymer comprising repeating subunits comprising at least one functional group, for forming a part in a hydrogen bond, selected from alcohol, amine, ether, amide, carboxylic acid, ester, ketone, nitrile, aldehyde, and carbamide;

a polyphenol with a molecular weight between 500-4000 Da comprising a minimum of 12 aromatic hydroxyl groups;

a solvent with a dielectric constant of at least 20; and an electrically conductive filler;

wherein the composition comprises between 10 and 50 wt. % of the solvent.

2. The composition according to claim 1, wherein the polyphenol has between 2 and 40 gallic acid, pyrogallic acid, sinapyl alcohol, coniferyl alcohol, or paracoumaryl alcohol moieties.

3. The composition according to claim 1, wherein the composition comprises between 10 and 60 wt. % of the polymer;

wherein the composition comprises between 30 and 70 wt. % of the polyphenol; and/or wherein the composition comprises between 2 and 10 wt. % of the conductive filler.

4. The composition according to claim 1, wherein the polymer is selected from the list including natural silk, synthetic silk, fibroin, starch, dextran, chitosan, polyvinyl alcohol, pectin, poly(ethylene glycol) diacrylate, polyacrylamide, polyethylene glycol, or a mixture thereof.

5. The composition according to claim 1, wherein the polymer comprises fibroin in β-sheet and/or β-turn formation, at least for 20% of the total length of the polymer.

6. The composition according to claim 1, wherein the polymer is a linear polymer.

7. The composition according to claim 1, wherein the polymer has a molecular weight between 10 and 1500 kDa; and/or wherein the polymer has between 1 and 7 hydrogen-bond acceptor groups, and/or between 1 and 7 hydrogen-bond donor groups, per repeated subunit.

8. The composition according to claim 1, wherein the conductivity of the composition is between $1\times10^{-6}$ and $1\times10^{-1}$ S/cm.

9. The composition according to claim 1, wherein the weight ratios between the polymer, the polyphenol, and the conductive filler are within the intervals 10-40:30-70:0.1-20 respectively.

10. The composition according to claim 1, wherein the composition is a self-healable composition; and/or wherein the composition is biocompatible and/or biodegradable.

11. The composition according to claim 1, wherein the viscosity at a shear rate of 1/s and a temperature of T=50° C. is between 100 and 2000 Pa·s; and/or wherein the Young's modulus, at room temperature, is below 40 kPa.

12. The composition according to claim 1, wherein the composition can be uniaxially stretched to a length of at least 100 times the original length before rupture; and/or wherein the composition has an elongation at break of at least 10000%.

13. The composition according to claim 1, wherein the polymer does not form a covalently cross-linked polymer network.

14. The composition according to claim 1, wherein at least 10 wt. % of the polyphenol is not bound to reduced graphene oxide.

15. The composition according to claim 1, wherein the composition comprises a salt.

16. The composition according to claim 15, wherein the salt is a divalent salt.

17. The composition according to claim 15, wherein the composition comprises between 10 and 20 wt. % of the salt; and/or wherein the weight ratios between the polymer, the polyphenol, the conductive filler and the salt are within the intervals 10-40:25-75:3-15:10-20, respectively.

18. The composition according to claim 1, wherein the solvent is water; and/or wherein the electrically conductive filler is selected from the list including graphene, intrinsically conducting polymers, iron ions, 2D transition metal carbides, carbonitrides, nitrides, MXenes, nanoclays, and/or elongated carbon nanostructures.

19. The composition according to claim 18, wherein the intrinsically conducting polymers are selected from polyaniline, polypyrrole, poly(3,4-ethylenedioxythiophene) and polystyrene sulfonate.

20. The composition according to claim 18, wherein the nanoclays are selected from bentonite, kaolinite, hectorite, halloysite, and montmorillonite.

21. The composition according to claim 18, wherein the elongated carbon nanostructures are carbon nanotubes.

22. A stress sensor comprising the supramolecular conductive polymer composition according to claim 1; and at least two electrical contacts, configured for measuring stress, and/or pressure.

23. The stress sensor according to claim 22, comprising a power source and an electronic test equipment, and wherein the stress sensor is arranged such that it forms at least one electrical circuit configured for measuring changes in an electrical property of the composition.

24. A method for making the supramolecular conductive polymer composition according to claim 1, said method comprising mixing a formulation comprising;

the polymer comprising the repeating subunits;

the polyphenol comprising the minimum of 12 aromatic hydroxyl groups;

the solvent with the dielectric constant of at least 20; and the electrically conductive filler.

* * * * *